US012786881B2

(12) United States Patent
Kim

(10) Patent No.: US 12,786,881 B2
(45) Date of Patent: Nov. 3, 2026

(54) METHOD AND APPARATUS FOR POWER SAVING USING WAKE-UP SIGNAL AND PDCCH MONITORING IN WIRELESS COMMUNICATION SYSTEM

(71) Applicant: SETLAB Co., LTD., Gyeonggi-do (KR)

(72) Inventor: Soenghun Kim, Gyeonggi-do (KR)

(73) Assignee: SETLAB Co., LTD., Gyeonggi-do (KR)

( * ) Notice: Subject to any disclaimer, the term of this patent is extended or adjusted under 35 U.S.C. 154(b) by 0 days.

(21) Appl. No.: 19/452,414

(22) Filed: Jan. 19, 2026

(65) Prior Publication Data

US 2026/0214584 A1 Jul. 23, 2026

(30) Foreign Application Priority Data

Jan. 19, 2025 (KR) ........................ 10-2025-0007677
Jan. 12, 2026 (KR) ........................ 10-2026-0005737

(51) Int. Cl.
*H04W 52/02* (2009.01)
*H04W 72/23* (2023.01)
*H04W 76/28* (2018.01)

(52) U.S. Cl.
CPC ....... *H04W 52/0235* (2013.01); *H04W 72/23* (2023.01); *H04W 76/28* (2018.02)

(58) Field of Classification Search
CPC .. H04W 52/0235; H04W 72/23; H04W 76/28
See application file for complete search history.

(56) References Cited

U.S. PATENT DOCUMENTS

2020/0092814 A1* 3/2020 Zhou ................. H04W 52/0235
2020/0229092 A1 7/2020 Wu et al.
2021/0051698 A1 2/2021 Tsai et al.
2021/0099954 A1* 4/2021 Agiwal ............. H04W 52/0229
(Continued)

OTHER PUBLICATIONS

3GPP, "3rd Generation Partnership Project; Technical Specification Group Radio Access Network; NR; Physical layer procedures for control (Release 18)", Sep. 2024, 312 pages, 3GPP TS 38.213 V18.4.0.
(Continued)

*Primary Examiner* — Farid Seyedvosoghi
(74) *Attorney, Agent, or Firm* — Nicholas Park

(57) ABSTRACT

A method and apparatus for efficient power consumption in wireless communication are provided. A terminal receives a radio resource control (RRC) message for Wake-Up Signal (WUS) reception from a base station and performs WUS monitoring for a special cell. When specific information is detected in a WUS reception, the terminal stops WUS monitoring and starts PDCCH monitoring for a plurality of serving cells. The PDCCH monitoring is performed based on a first timer that starts at a specific time point determined based on a time offset parameter between start of WUS occasion and start of the first timer. The RRC message comprises parameters indicating information to be monitored in WUS, length of the first timer, and the time offset. Upon receiving a MAC message containing a specific logical channel identity during PDCCH monitoring, the terminal stops the first timer and resumes WUS monitoring.

9 Claims, 16 Drawing Sheets

(56) References Cited

U.S. PATENT DOCUMENTS

| | | | | |
|---|---|---|---|---|
| 2021/0360528 | A1* | 11/2021 | Cai | H04L 5/001 |
| 2022/0287071 | A1 | 9/2022 | Seo et al. | |
| 2024/0147368 | A1* | 5/2024 | Shubhi | H04W 52/0235 |

OTHER PUBLICATIONS

3GPP, "3rd Generation Partnership Project; Technical Specification Group Radio Access Network; NR; Physical layer procedures for data (Release 18)", Sep. 2024, 301 pages, 3GPP TS 38.214 V18.4.0.

3GPP, "3rd Generation Partnership Project; Technical Specification Group Radio Access Network; NR; Medium Access Control (MAC) protocol specification (Release 18)", Sep. 2024, 335 pages, 3GPP TS 38.321 V18.3.0.

3GPP, "3rd Generation Partnership Project; Technical Specification Group Radio Access Network; NR; Radio Resource Control (RRC) protocol specification (Release 18)", Sep. 2024, 1694 pages, 3GPP TS 38.331 V18.3.0.

Ministry of Intellectual Property(Korean Intellectual Property Office), Office Action issued for Korean Patent Application No. 10-2026-0005737, Apr. 22, 2026.

* cited by examiner

METHOD AND APPARATUS FOR POWER SAVING USING WAKE-UP SIGNAL AND PDCCH MONITORING IN WIRELESS COMMUNICATION SYSTEM

CROSS-REFERENCE TO RELATED APPLICATION

This application claims priority to and the benefit of Korean Patent Application No 10-2025-0007677, filed on Jan. 19, 2025, and 10-2026-0005737, filed on Jan. 12, 2026. Each of the above documents is incorporated herein by reference in its entirety.

BACKGROUND

Technical Field

The present disclosure relates to power saving for a terminal.

Related Art

In modern cellular networks, User Equipment (UE) power consumption remains a critical challenge, particularly for Internet of Things (IoT) and wearable devices with limited battery capacity. Traditional Radio Resource Control (RRC) state management focuses on optimizing power consumption primarily through RRC_IDLE and RRC_INACTIVE states, while devices in RRC_CONNECTED state typically maintain continuous monitoring of control channels, resulting in significant battery drain even during periods of minimal data transmission.

The existing power-saving mechanisms for RRC_CONNECTED devices, such as Discontinuous Reception (DRX), provide only limited efficiency as they still require periodic wake-up and monitoring of control channels at relatively short intervals. This inefficiency becomes particularly problematic for devices that need to maintain connectivity for extended periods while transmitting data sporadically, such as healthcare monitors, industrial sensors, or connected vehicles in certain operational modes. The power consumption during these extended connected periods substantially impacts device battery life and operational efficiency.

Low-Power Wake-Up Signal (LP-WUS) technology in RRC_CONNECTED state addresses this critical gap by enabling devices to enter deeper sleep states while still maintaining their connection status. Unlike conventional approaches that require frequent awakening, LP-WUS allows the network to specifically trigger a device's wake-up only when necessary for data transmission or reception. This innovation represents a paradigm shift in connected-mode power management, potentially extending battery life by orders of magnitude for certain use cases while preserving the responsiveness and connectivity benefits of the RRC_CONNECTED state. The development of LP-WUS for connected devices is therefore essential to meet the growing demands for energy efficiency in next-generation wireless networks.

SUMMARY

The present disclosure relates to wireless communication systems, and more particularly, to methods and apparatus for efficient power consumption using Wake-Up Signal (WUS) and Physical Downlink Control Channel (PDCCH) monitoring in a terminal.

A method performed by a terminal comprises receiving from a base station radio resource control (RRC) message for Wake-Up Signal (WUS) reception, performing WUS monitoring for a special cell based on the RRC message, and in case that specific information is detected in a WUS reception, stopping WUS monitoring for the special cell and starting PDCCH monitoring for a plurality of serving cells. The PDCCH monitoring is performed based on a first timer being running, where the first timer starts at a specific time point. The length of the first timer is configured by a parameter indicating length of first timer, and the specific time point is determined based on a parameter indicating time offset between start of WUS occasion and start of first timer. The RRC message comprises the parameter indicating information to be monitored in WUS, the parameter indicating length of first timer, and the parameter indicating time offset.

The method further comprises, in case that a Medium Access Control (MAC) message containing a specific logical channel identity is received during PDCCH monitoring, stopping the first timer, stopping PDCCH monitoring for the plurality of serving cells, and starting WUS monitoring for the special cell. To perform WUS monitoring, the terminal receives n WUSs per specific periodicity during a specific time duration that is not part of C-DRX active time and is part of Cell DTX inactive period. The plurality of serving cells comprise the special cell and currently activated secondary cells. Multiple timers may start as a consequence of the specific information being detected in the WUS reception to control PDCCH monitoring for different sets of serving cells.

DETAILED DESCRIPTION

Hereinafter, embodiments of the present disclosure will be described in detail with reference to the accompanying drawings. In addition, in the description of the present disclosure, if it is determined that a detailed description of a related known function or configuration may unnecessarily obscure the gist of the present disclosure, the detailed description thereof will be omitted. In addition, the terms to be described later are terms defined in consideration of functions in the present disclosure, which may vary according to intentions or customs of users and operators. Therefore, the definition should be made based on the content throughout this specification.

The terms used, in the following description, for indicating access nodes, network entities, messages, interfaces between network entities, and diverse identity information is provided for convenience of explanation. Accordingly, the terms used in the following description are not limited to specific meanings but may be replaced by other terms equivalent in technical meanings.

In the following descriptions, the terms and definitions given in the 3GPP standards are used for convenience of explanation. However, the present disclosure is not limited by use of these terms and definitions and other arbitrary terms and definitions may be employed instead.

Figure 1:
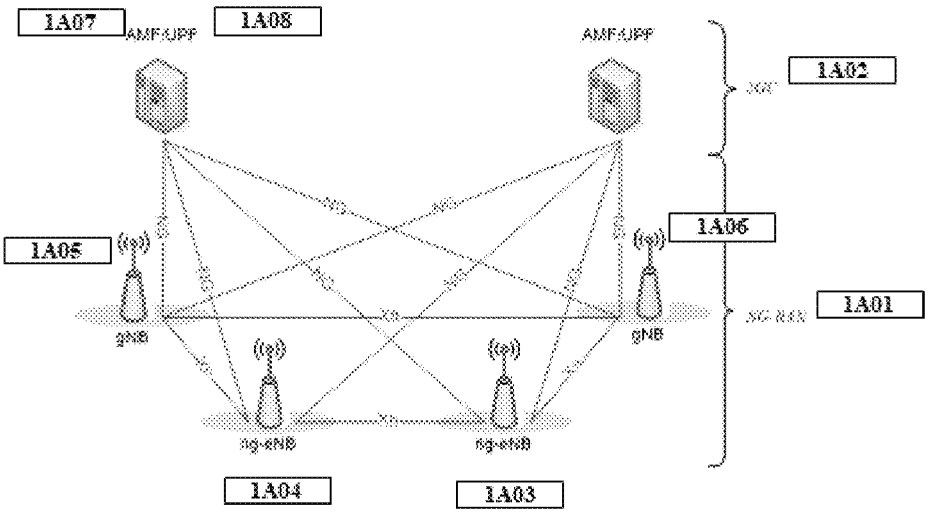
FIG. 1 is a diagram illustrating the architecture of an 5G system and a NG-RAN.

In the present disclosure, followings are used interchangeably:

MR and main receiver and main radio;

LR and lower power receiver and lower power radio;

T_DRX_RAN and UE specific DRX value configured by RRC;

T_DRX_CN and UE specific DRX value configured by upper layers;

WUS occasion and WUS burst and LO;

LP-WUS and LMO;

sequence and bit string and code point (a sequence is a bit string which may represent a code point);

FIG. 1 is a diagram illustrating the architecture of an 5G system and a NG-RAN to which the disclosure may be applied.

5G system consists of NG-RAN 1A01 and 5GC 1A02. An NG-RAN node is either:

>1: a gNB, providing NR user plane and control plane protocol terminations towards the UE; or >1: an ng-eNB, providing E-UTRA user plane and control plane protocol terminations towards the UE.

The gNBs 1A05 or 1A06 and ng-eNBs 1A03 or 1A04 are interconnected with each other by means of the Xn interface. The gNBs and ng-eNBs are also connected by means of the NG interfaces to the 5GC, more specifically to the AMF (Access and Mobility Management Function) and to the UPF (User Plane Function). AMF 1A07 and UPF 1A08 may be realized as a physical node or as separate physical nodes.

A gNB 1A05 or 1A06 or an ng-eNBs 1A03 or 1A04 hosts the various functions listed below:

Functions for Radio Resource Management such as Radio Bearer Control, Radio Admission Control, Connection Mobility Control, Dynamic allocation of resources to UEs in uplink, downlink and sidelink (scheduling); IP and Ethernet header compression, uplink data decompression and encryption of user data stream; Selection of an AMF at UE attachment when no routing to an MME can be determined from the information provided by the UE; Routing of User Plane data towards UPF; Scheduling and transmission of paging messages; Scheduling and transmission of broadcast information (originated from the AMF or O&M); Measurement and measurement reporting configuration for mobility and scheduling; Session Management; QoS Flow management and mapping to data radio bearers; Support of UEs in RRC_INACTIVE state.

The AMF 1A07 hosts the functions such as NAS signaling, NAS signaling security, AS security control, SMF selection, Authentication, Mobility management and positioning management.

The UPF 1A08 hosts the functions such as packet routing and forwarding, transport level packet marking in the uplink, QoS handling and the downlink, mobility anchoring for mobility etc.

Figure 2:
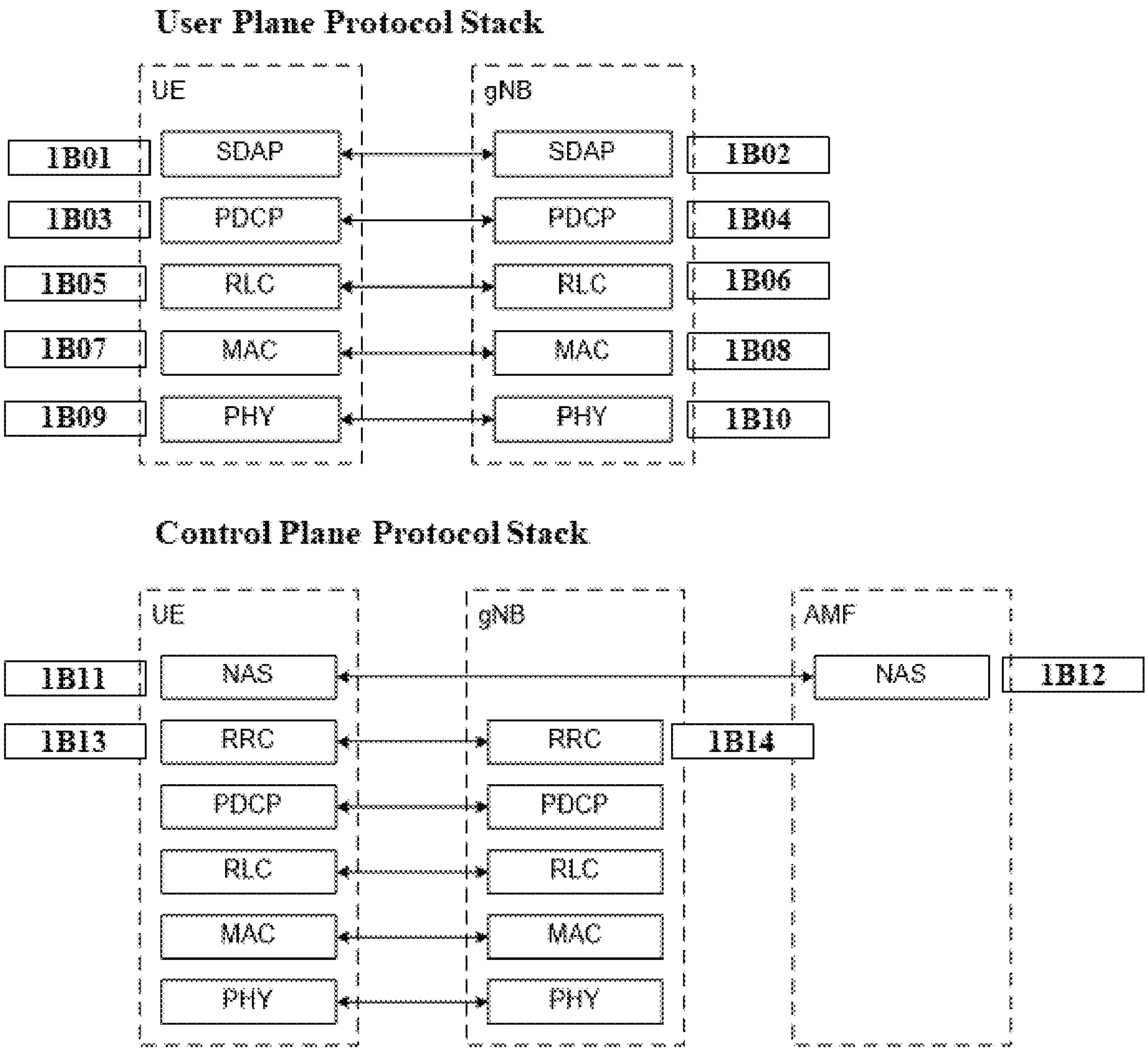
FIG. 2 is a diagram illustrating a wireless protocol architecture in an 5G system.

FIG. 2 is a diagram illustrating a wireless protocol architecture in an 5G system to which the disclosure may be applied.

User plane protocol stack consists of SDAP 1B01 or 1B02, PDCP 1B03 or 1B04, RLC 1B05 or 1B06, MAC 1B07 or 1B08 and PHY 1B09 or 1B10. Control plane protocol stack consists of NAS 1B11 or 1B12, RRC 1B13 or 1B14, PDCP, RLC, MAC and PHY.

Each protocol sublayer performs functions related to the operations listed below.

NAS: authentication, mobility management, security control etc.

RRC: System Information, Paging, Establishment, maintenance and release of an RRC connection, Security functions, Establishment, configuration, maintenance and release of Signalling Radio Bearers (SRBs) and Data Radio Bearers (DRBs), Mobility, QoS management, Detection of and recovery from radio link failure, NAS message transfer etc.

SDAP: Mapping between a QoS flow and a data radio bearer, Marking QoS flow ID (QFI) in both DL and UL packets.

PDCP: Transfer of data, Header compression and decompression, Ciphering and deciphering, Integrity protection and integrity verification, Duplication, Reordering and in-order delivery, Out-of-order delivery etc.

RLC: Transfer of upper layer PDUs, Error Correction through ARQ, Segmentation and re-segmentation of RLC SDUs, Reassembly of SDU, RLC re-establishment etc.

MAC: Mapping between logical channels and transport channels, Multiplexing/demultiplexing of MAC SDUs belonging to one or different logical channels into/from transport blocks (TB) delivered to/from the physical layer on transport channels, Scheduling information reporting, Priority handling between UEs, Priority handling between logical channels of one UE etc.

PHY: Channel coding, Physical-layer hybrid-ARQ processing, Rate matching, Scrambling, Modulation, Layer mapping, Downlink Control Information, Uplink Control Information etc.

Figure 3:
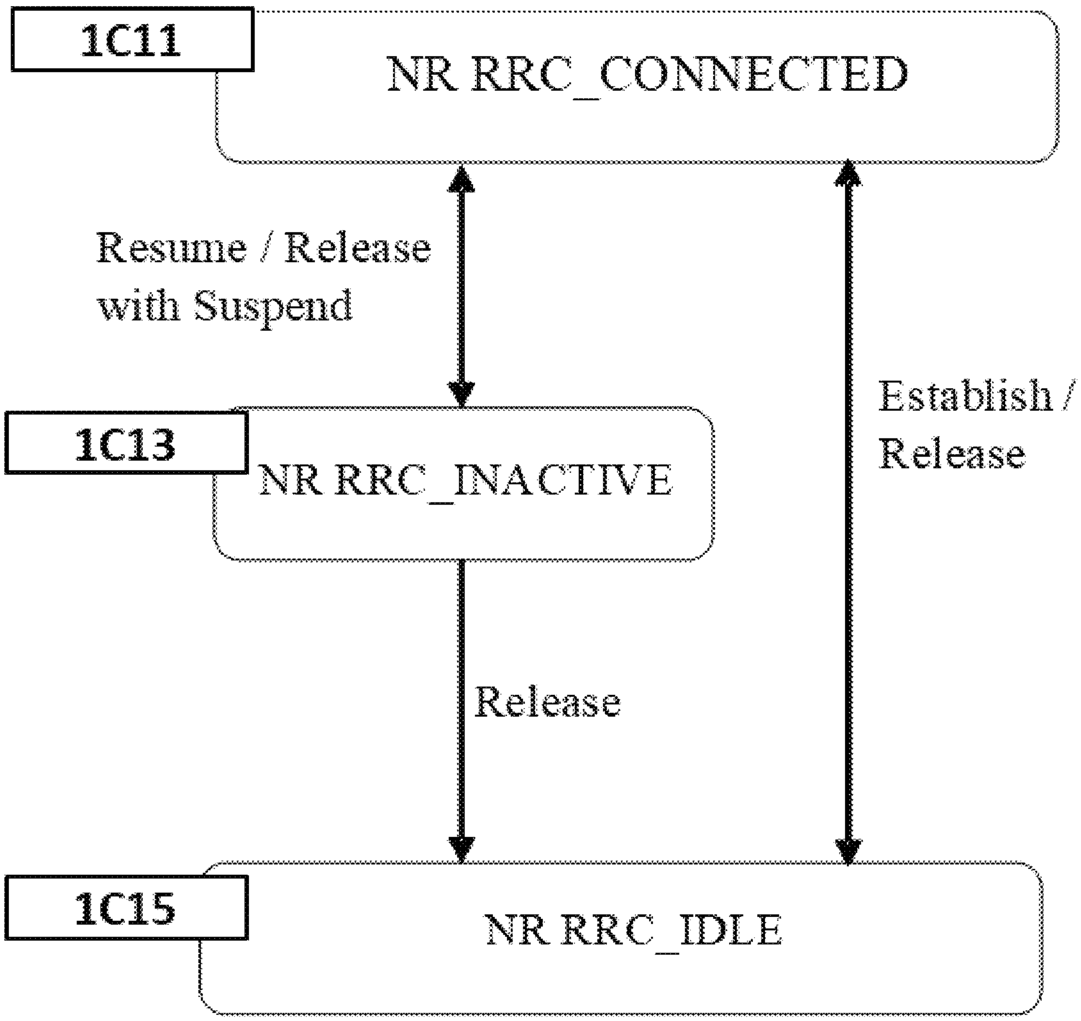
FIG. 3 is a diagram illustrating state transitions.

FIG. 3 is a diagram illustrating an RRC state transition.

Between RRC_CONNECTED 1C11 and RRC_INACTIVE 1C13, a state transition occurs by the exchange of the Resume message and the Release message containing the Suspend IE.

A state transition occurs between RRC_CONNECTED 1C11 and RRC_IDLE 1C15 through RRC connection establishment and RRC connection release.

The UE supports three RRC states.

In RRC_IDLE, UE has no RRC connection with RAN. The UE monitors paging channel and idle mode mobility (UE based mobility). As name implies, in RRC_IDLE state, data transmission/reception is not possible and power consumption is minimal. To perform data transfer, UE is required to transition to RRC_CONNECTED state.

In RRC_CONNECTED, UE has valid RRC connection with RAN. The UE establishes radio bearer configured for data transmission/reception. UE mobility is handled by network-controlled handover. RRC_CONNECTED state is most power-consuming state. To minimize power consumption during this state, C-DRX and other technique can be applied.

In RRC_INACTIVE, UE has suspended RRC connection with RAN. Before performing full scale data transfer, the UE and the base station resume the suspended RRC connection. UE mobility is handled by idle mode mobility within RAN defined area. If UE is capable of and configured by the base station, data transfer in limited scale can be performed in RRC_INACTIVE state, which is called small data transmission procedure.

RRC_IDLE state can be characterized with followings:

>1: PLMN selection; Broadcast of system information;

>1: Cell re-selection mobility;

>1: Paging for mobile terminated data is initiated by 5GC;

>1: DRX for CN paging configured by NAS.

RRC_INACTIVE state can be characterized with followings:

>1: PLMN selection; Broadcast of system information;

>1: Cell re-selection mobility;

>1: Paging is initiated by NG-RAN (RAN paging);

>1: RAN-based notification area (RNA) is managed by NG-RAN;

>1: DRX for RAN paging configured by NG-RAN;

>1: 5GC-NG-RAN connection (both C/U-planes) is established for UE;

>1: The UE AS context is stored in NG-RAN and the UE;

>1: NG-RAN knows the RNA which the UE belongs to.

RRC_CONNECTED state can be characterized with followings:

>1: 5GC-NG-RAN connection (both C/U-planes) is established for UE;

>1: The UE AS context is stored in NG-RAN and the UE;

>1: NG-RAN knows the cell which the UE belongs to;

>1: Transfer of unicast data to/from the UE;

>1: Network controlled mobility including measurements.

Figure 4:
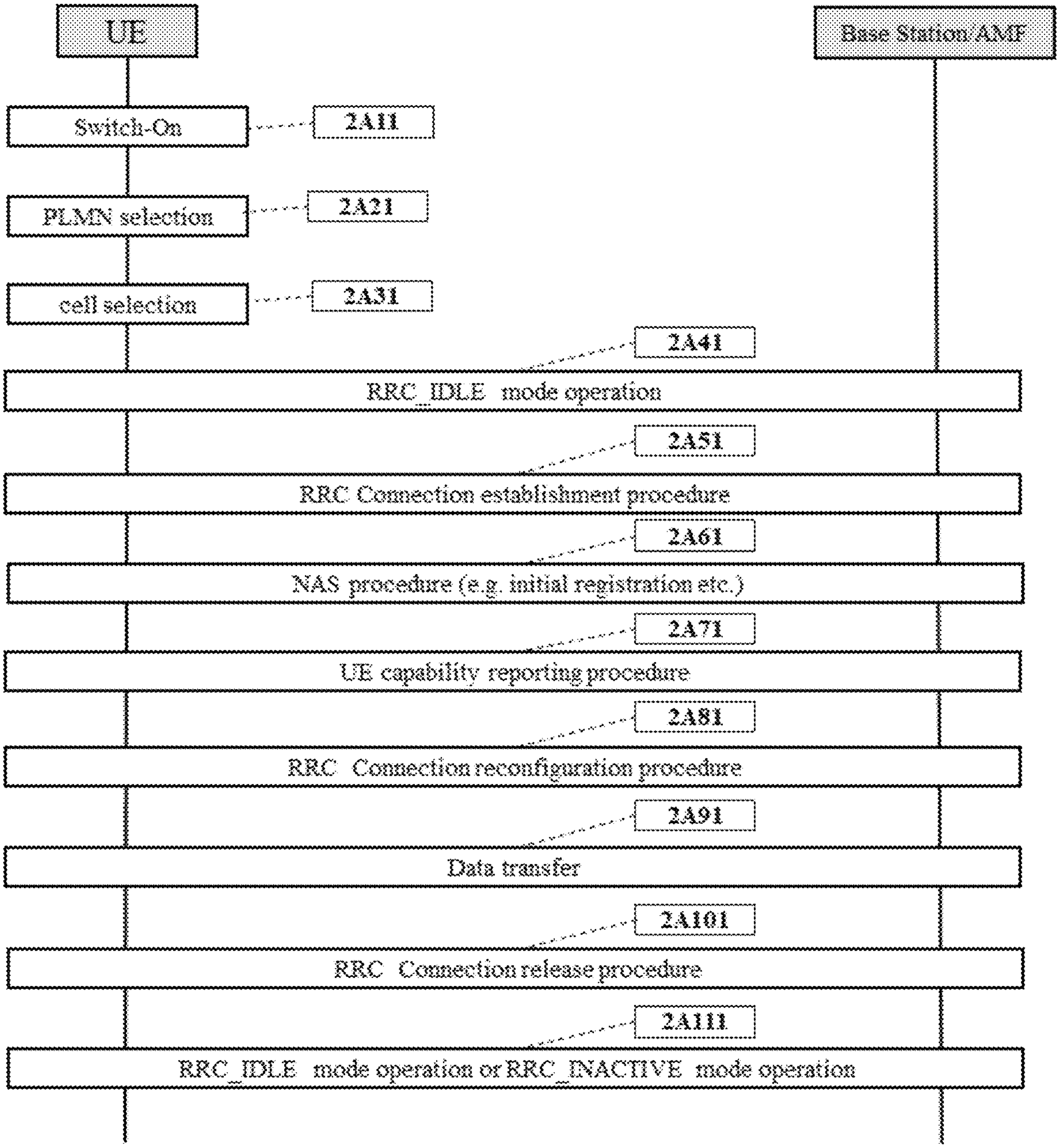
FIG. 4 illustrates overall operation of the UE and network.

FIG. 4 illustrates overall operation of the UE and network.

Upon switch-on of the wireless device (e.g. UE) 2A11, UE performs PLMN selection 2A21 to select the carrier that is provided by the PLMN that UE is allowed to register.

Then UE performs cell selection 2A31 to camp on a suitable cell.

Once camping on a suitable cell, UE performs RRC_IDLE mode operation 2A41 such as paging channel monitoring and cell reselection and system information acquisition.

UE performs RRC Connection establishment procedure 2A51 to perform e.g. NAS procedure such as initial registration with the selected PLMN.

After successful RRC connection establishment, UE performs NAS procedure 2A61 by transmitting a corresponding NAS message via the established RRC connection (e.g. SRB1).

The base station can trigger UE capability reporting procedure 2A71 before configuring data bearers and various MAC functions.

The base station and the UE perform RRC connection reconfiguration procedure 2A81. Via the procedure, data radio bearers and logical channels and various MAC functions (such as DRX and BSR and PHR and beam failure reporting etc) and various RRC functions (such as RRM and RLM and measurement etc) are configured.

The base station and the UE perform data transfer 2A91 via the established radio bearers and based on configured MAC functions and configured RRC functions.

If geographical location of UE changes such that e.g. the current serving cell is no longer providing suitable radio condition, the base station and the UE perform cell level mobility such as handover or conditional reconfiguration or lower layer triggered mobility.

When RRC connection is not longer needed for the UE because of e.g. no more traffic available for the UE, the base station and the UE performs RRC connection release procedure 2A101. The base station can transit UE state either to RRC_IDLE (if the data activity of the UE is expected low) or to RRC_INACTIVE (if the data activity of the UE is expected high).

The UE performs either RRC_IDLE operation or RRC_INACTIVE mode operation 2A111 until the next event to RRC connection establishment/resumption occurs.

Figure 5:
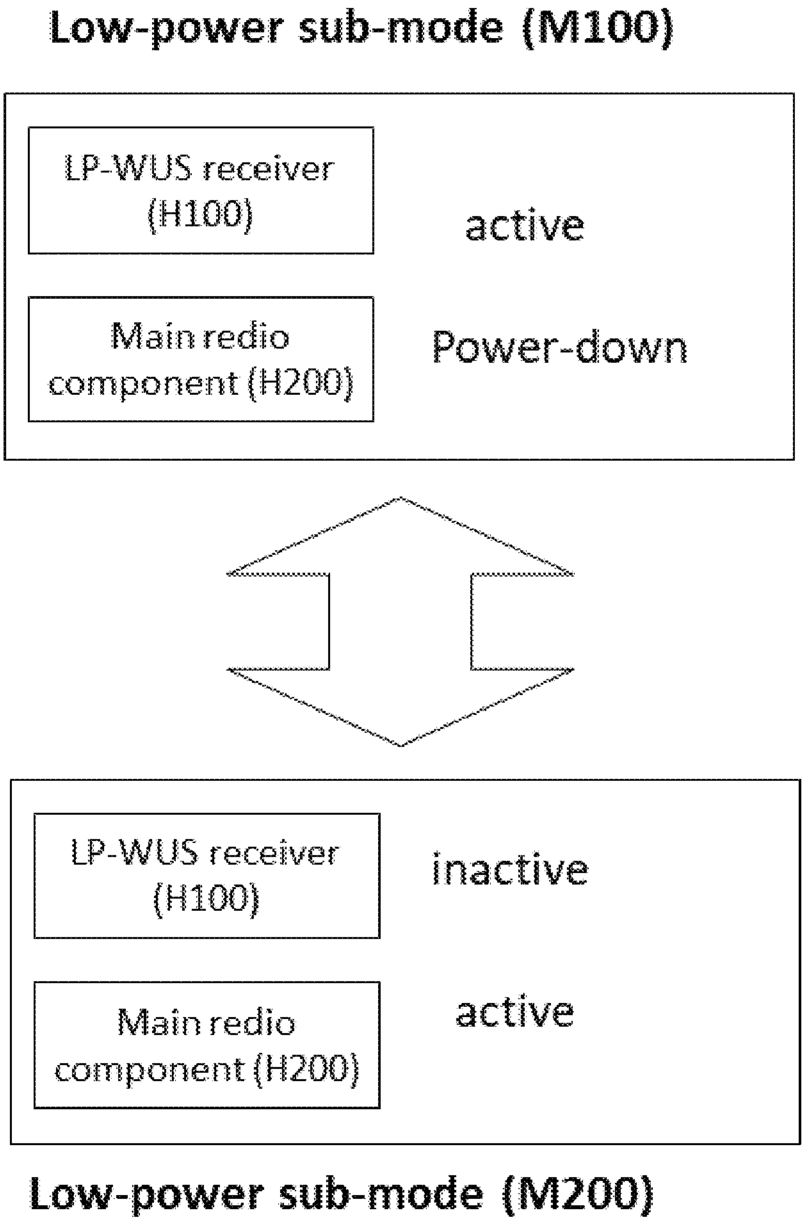
FIG. 5 illustrates LP-WUS receiver and main radio component.

FIG. 5 illustrates LP-WUS receiver and main radio component.

The LP-WUS receiver (H100) represents a specialized hardware component designed with ultra-low power consumption as its primary design objective. Unlike the main radio (H200), which incorporates comprehensive signal processing capabilities for demodulating complex waveforms and decoding various control and data channels, the LP-WUS receiver employs a minimalist architecture focused exclusively on detecting specific wake-up signal patterns. This dedicated receiver typically consists of a simplified RF front-end with narrowband filtering, an energy detector or correlator for signal identification, and minimal baseband processing circuitry. The power consumption of this component is engineered to be orders of magnitude lower than the main radio—typically in the micro-watt range—enabling continuous operation even during extended power-saving periods while maintaining RRC_CONNECTED state.

The main radio component (H200), in contrast, encompasses the conventional cellular transceiver functionality with multiple analog and digital processing stages. This includes wideband RF circuitry, analog-to-digital and digital-to-analog converters, multiple oscillators and synthesizers, digital signal processors, protocol stack processors, and associated memory systems. These components collectively enable the device to perform complex operations such as channel estimation, equalization, MIMO processing, advanced decoding, and protocol handling across multiple layers. The sophisticated capabilities of the main radio come at the cost of significant power consumption, typically in the hundreds of milliwatts to watts range during active operation, which necessitates its deactivation during power-saving periods. When a device enters a low-power sub-mode (M100) while maintaining RRC_CONNECTED state, the main radio components responsible for conventional signal processing are powered down or significantly throttled, while the ultra-low-power WUS receiver remains active. This LP receiver operates with minimal power consumption—typically orders of magnitude lower than the main radio—while continuously monitoring only for the specific wake-up signal pattern, effectively acting as a power-efficient sentinel for the dormant main radio system.

Upon detection of a valid LP-WUS from the network, the device may enter a main-radio sub-mode (M200). In the mode the main radio component is activated and LP-WUS component may be deactivated.

In this disclosure, following terminologies are used interchangeably.

>: UE and terminal and MAC entity and device;

>: SS/PBCH block and SSB;

For power saving in RRC_CONNECTED state, low power receiver can be utilized. In this disclosure, UE is configured to perform power-efficient mode or data transfer-efficient mode. The change between the modes are triggered explicitly or implicitly.

Figure 6:
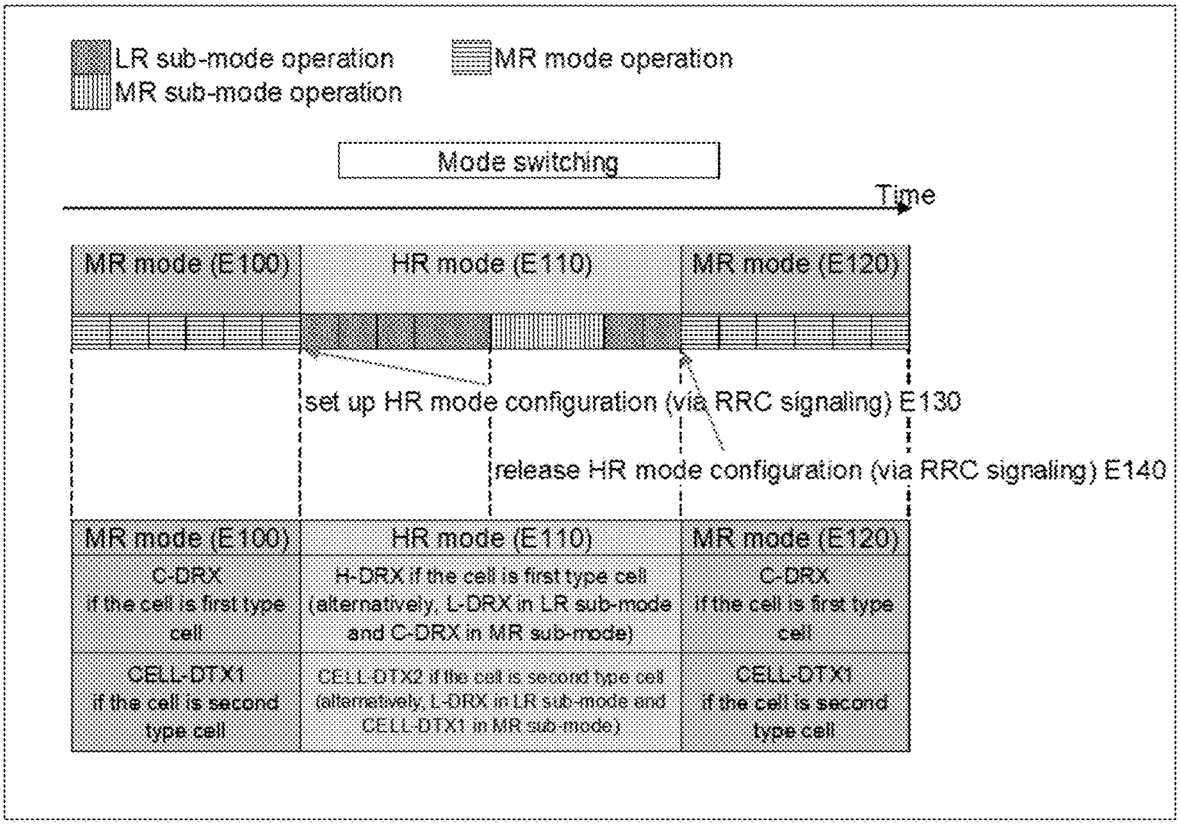
FIG. 6 is an example of the transition between MR mode and HR mode.

FIG. 6 is an example of the transition between MR mode and HR mode.

For power efficient operations in this disclosure, UE and base station perform followings.

>: UE and the base station operate in MR-based-connected-mode (denoted as MR mode) E100.
>>: When in MR mode, UE and the base station perform MR mode operations for PDCCH monitoring and measurement.
>: The base station may decide to enable LR/MR-based-connected-mode (HR mode) for the UE.
>>: The decision can be made based on many factors such as UE battery level, channel state, traffic pattern and others.
>: The base station configures UE with HR mode.
>>: When in HR mode, UE and the base station perform LR-sub-mode operation and MR-sub-mode operation alternatively E110.
>: The base station may decide to disable HR mode for the UE. The base station and the UE switches back to MR mode E120.

<MR Mode Operation>

>: It is set of operations based on MR.
>: UE performs MR mode operation when in MR mode.
>: MR mode operation comprises ST1, ST2, MT1, MT2 and MT3.
>: For MR downlink reception:
>>: Following MR downlink signals from MR_DL_RX_SCHEDULE are received based on C-DRX or Cell-DTX1:
>>>: PDCCH, PDSCH, PDSCH DM-RS.
>>: MR_DL_RX_SCHEDULE comprises followings:
>>>: Active serving cells (PCell and Activated SCells).
>>: Following MR downlink signals from MR_DL_RX_MEASURE are measured:
>>>: SSB, CSI-RS, TRS, PBCH DM-RS.
>>: MR_DL_RX_MEASURE comprises followings:
>>>: Active serving cells;
>>>: deactivated SCells;
>>>: intra-frequency neighboring cells; and
>>>: inter-frequency neighboring cells.
>: For LR downlink reception:
>>: No LR downlink signal is received/measured.
>: For power saving:
>>: C-DRX or CELL-DTX1 is applied.

<LR Sub-Mode Operation>

>: It is set of operations based on LR.
>: UE performs LR sub-mode operation when in LR sub-mode.
>: LR sub-mode operation comprises ST3 and MT4.
>: For MR downlink reception:
>>: No MR downlink signal is received.
>: For LR downlink reception:
>>: LP-WUS for scheduling and LP-SS for measurement.
>: For power saving:
>>: L-DRX (monitoring LP-WUS periodically) is applied.

<MR Sub-Mode Operation>

>: It is set of operations based on MR.
>: UE performs MR sub-mode operation when in MR sub-mode.
>: MR sub-mode operation comprises ST1, ST2, MT1 and MT2.
>: UE performs MR downlink reception and LR downlink reception simultaneously.
>: For MR downlink reception:
>>: Following MR downlink signals from MR_DL_RX_SCHEDULE are received during ON_period:
>>>: PDCCH, PDSCH, PDSCH DM-RS.
>>: MR_DL_RX_SCHEDULE comprises followings:
>>>: Active serving cells (PCell and Activated SCells).
>>: Following MR downlink signals from MR_DL_RX_MEASURE are measured:
>>>: SSB, CSI-RS, TRS, PBCH DM-RS.
>>: MR_DL_RX_MEASURE comprises followings:
>>>: Active serving cells; and
>>>: deactivated SCells;
>: For LR downlink reception:
>>: LP-WUS during a specific period (when SpCell is not in the cell DTX Active Period). Transmitting LP-WUS consumes small amount of energy. To enhance reachability of the UE, network may configure UE to monitor LP-WUS during cell DTX non Active Period.
>: For power saving:
>>: C-DRX and CELL-DTX2 is applied; or
>>: H-DRX and CELL-DTX2 is applied.

Figure 7:
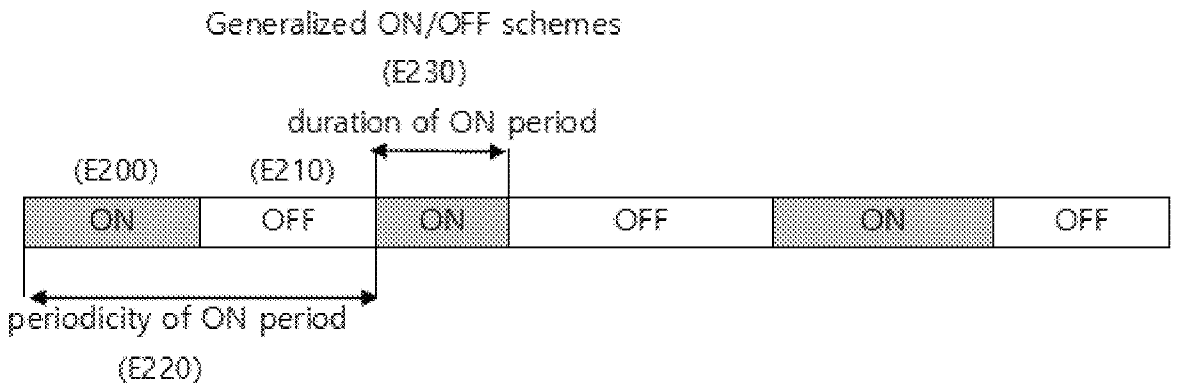
FIG. 7 illustrates a general concept of power saving scheme.

FIG. 7 illustrates a general concept of power saving scheme.

For power saving purposes, various on/off schemes are used. The schemes can be generalized as below.

>: ON period E200 and OFF period E210 alternate periodically.
>>: During ON period, UE performs scheduling related tasks.
>: Periodicity/duration of ON period can be configured by RRC.
>: A static value can be configured for periodicity E220. Periodicity does not change short term.
>: A static value can be configured for duration E230. The value defines minimum length of duration. The duration can be extended event-drivenly.
>: ON period can occur irregularly.
>: on/off scheme used in this disclosure are C-DRX, H-DRX, Cell-DTX1 and Cell-DTX2.
>: ON period is Active Time (AT) in C-DRX, Hybrid Active Time (HAT) in H-DRX, Period 1/5/6 in Cell-DTX1 and Period 11/15/16 in Cell-DTX2.

<C-DRX>

C-DRX is a baseline power saving scheme for UE in RRC_CONNECTED. Two on/off patterns are determined based on C-DRX parameters. Each on/off pattern is applied to all first type cells in a DRX group. DRX group consists of one or more serving cells.

C-DRX is applied to a Serving Cell in case that:

>: the Serving Cell is first type cell;
>: HR mode is not configured (or configured but not activated).

<Cell-DTX1>

CELL-DTX1 is a power saving scheme where on/off pattern is determined based on C-DRX parameters and Cell DTX parameters. CELL-DTX1 is applied to second type serving cell.

CELL-DTX1 is applied to a Serving Cell in case that:

>: the Serving Cell is second type cell;

>: HR mode is not configured (or configured but not activated).

<H-DRX>

H-DRX is a power saving scheme when UE is operating in HR mode. One on/off pattern determined based on H-DRX parameters. H-DRX is applied to all first type serving cells.

H-DRX is applied to a Serving Cell in case that:

>: the Serving Cell is first type cell;

>: HR mode is configured (or configured and activated).

<CELL-DTX2>

CELL-DTX2 is a power saving scheme where on/off pattern is determined based on H-DRX parameters and Cell DTX parameters. CELL-DTX2 is applied to second type serving cell.

CELL-DTX2 is applied to a Serving Cell in case that:

>: the Serving Cell is second type cell;

>: HR mode is configured (or configured and activated).

Serving Cell Type

A Serving Cell is first type cell in case that:

>: The Serving Cell is Active Serving Cell (SpCell and active SCell); and

>: cell DTX is not configured for the Serving Cell.

A Serving Cell is second type cell in case that:

>: The Serving Cell is Active Serving Cell (SpCell and active SCell); and

>: cell DTX is configured for the Serving Cell.

Figure 8:
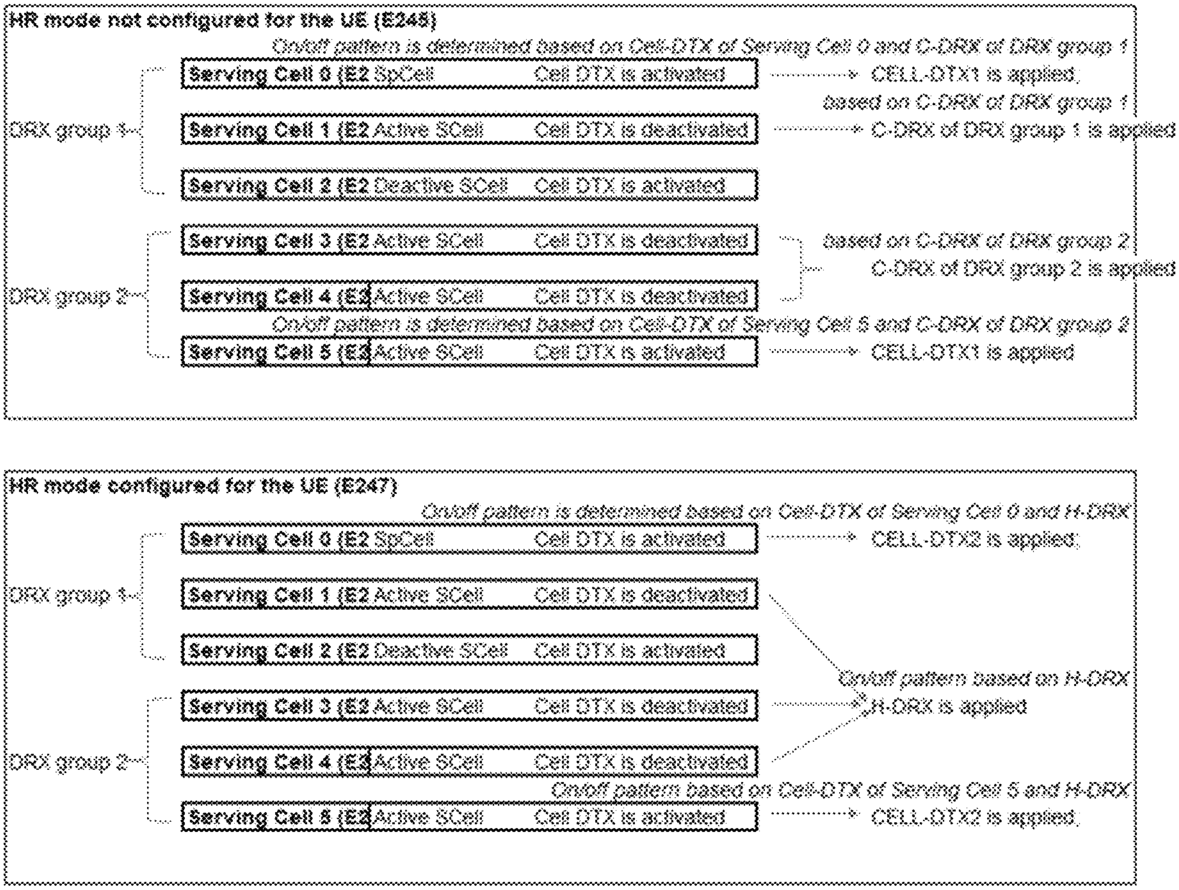
FIG. 8 illustrates an example of DRX operations of serving cells.

FIG. 8 illustrates an example of DRX operations of serving cells.

For example, in a scenario where UE is configured with:

>: Serving Cell 0 E250 which is SpCell and for which Cell DTX is activated;

>: Serving Cell 1 E260 which is activated SCell and for which Cell DTX is deactivated;

>: Serving Cell 2 E270 which is deactivated SCell and for which Cell DTX is activated;

>: Serving Cell 3 E280 which is deactivated SCell and for which Cell DTX is deactivated;

>: Serving Cell 4 E290 which is activated SCell and for which Cell DTX is deactivated;

>: Serving Cell 5 E295 which is activated SCell and for which Cell DTX is activated;

DRX group1 consists of Cell0, Cell1 and Cell2. DRX group2 consists of Cell3, Cell4 and Cell5.

In case that HR mode is not configured for the UE E245,

>: Cell1, Cell3 and Cell4 are first type cell. C-DRX is applied. On/off patterns (DRX patterns) are determined based on C-DRX parameter of DRX group that corresponding serving cell belongs to.

>: Cell0 and Cell5 are second type cell. CELL-DTX1 is applied. On/off patterns (DRX pattern) are determined based on Cell-DTX parameter of the corresponding serving cell and C-DRX parameter of DRX group that corresponding serving cell belongs to.

In case that HR mode is configured for the UE E247,

>: Cell1, Cell3 and Cell4 are first type cell. H-DRX is applied. On/off patterns (DRX patterns) are determined based on H-DRX parameter.

>: Cell0 and Cell5 are second type cell. CELL-DTX2 is applied. On/off patterns (DRX pattern) are determined based on Cell-DTX parameter of the corresponding serving cell and H-DRX parameter.

Figure 9:
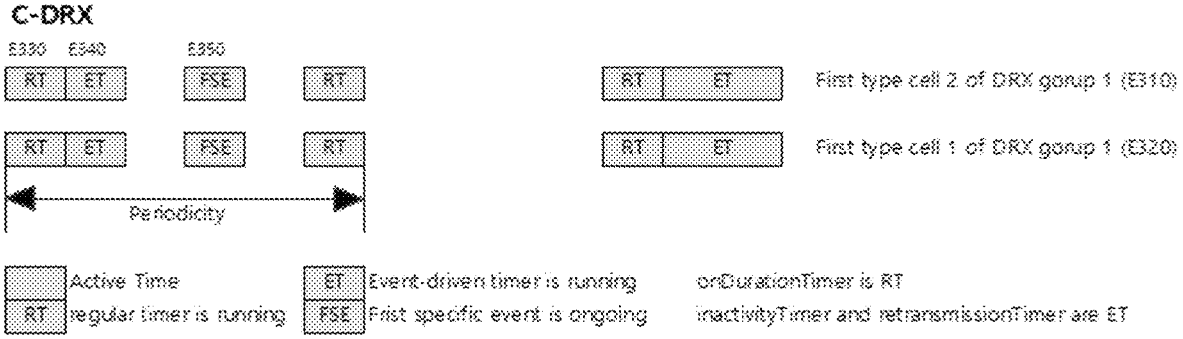
FIG. 9 illustrates C-DRX operations.

FIG. 9 illustrates C-DRX operations

For each Serving Cell that is first type cell E310 E320,

UE monitors PDCCH of the Serving Cell in a DRX group in case that:

>: the DRX group of the Serving Cell is in Active Time.

UE is not required to monitor PDCCH of the Serving Cell in a DRX group in case that:

>: the DRX group of the Serving Cell is not in Active Time.

DRX group is in Active Time while:

>: drx-onDurationTimer or drx-InactivityTimer configured for the DRX group is running E330 E340; or >: drx-RetransmissionTimerDL, drx-RetransmissionTimerUL or drx-RetransmissionTimerSL is running on any Serving Cell in the DRX group E340; or >: first_event is ongoing E350; or >: second_event is ongoing.

Figure 10:
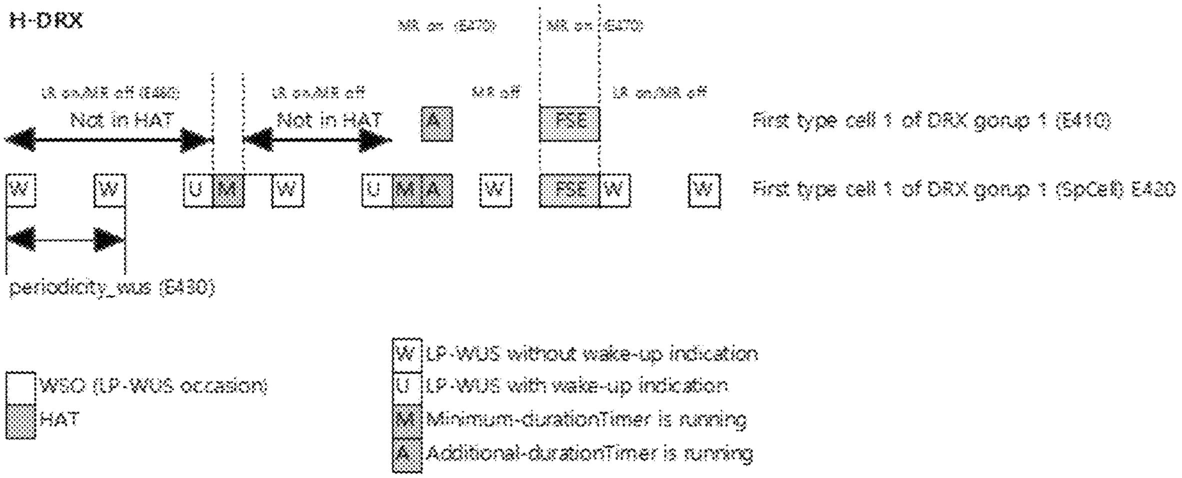
FIG. 10 illustrates H-DRX operations.

FIG. 10 illustrates H-DRX operations

While UE is not in Hybrid Active Time,

>: UE monitors LP-WUS based on a configured LP-WUS-Cycle E430; and

>: UE is not required to monitor PDCCH of any serving cell.

While UE is in Hybrid Active Time,

>: UE is not required to monitor LP-WUS;

>: UE monitors PDCCH of SpCell while:

>>: minimum-duration timer is running; or

>>: second_event is ongoing;

>: UE monitors PDCCH of first type cells (including SpCell) while:

>>: additional-durationTimer is running;

>>: first_event is ongoing; or

>>: third_event is ongoing.

UE keeps LR on and MR off (as in E460) while not in HAT.

UE keeps MR on (as in E470) while in HAT.

LR performs reception of downlink signals from a specific downlink carrier (SpCell).

MR performs reception of downlink signals from:

>: the specific downlink carrier while minimum-durationTimer is running;

>: while additional-durationTimer is running or while first_event is ongoing:

>>: a set of specific downlink carriers (carriers corresponding to first type cells) for scheduling; and >>: a set of second specific downlink carriers for measurement.

UE is in Hybrid Active Time in case that:

>: minimum-durationTimer is running; or

>: additional-durationTimer is running; or

>: first_event is ongoing.

minimum-durationTimer starts at a slot n+m when LP-WUS with valid indication is received at slot n. m is configured by RRC.

additional-durationTimer starts at slot k when the UE is scheduled (either for initial transmission or for retransmission) for any second type cell at slot k.

additional-durationTimer starts at slot q+r when short message in paging DCI indicates system information update is required. r is determined based on one or more parameters in system information and a parameter in RRC.

UE starts HAT at the boundary of the next modification period and continues HAT until “SI acquisition procedure” is completed in case that short message in paging DCI indicates system information update is required (systemInfoModification bit is set to 1).

UE starts HAT at the next SIB1 occasion and continues HAT until SIB6/7/8 is acquired when short message in paging DCI indicates ETWS/CMAS (etwsAndCmasIndication bit is set to 1).

Alternatively, UE may apply L-DRX in LR sub-mode operation and C-DRX in MR sub-mode operation.

Figure 11:
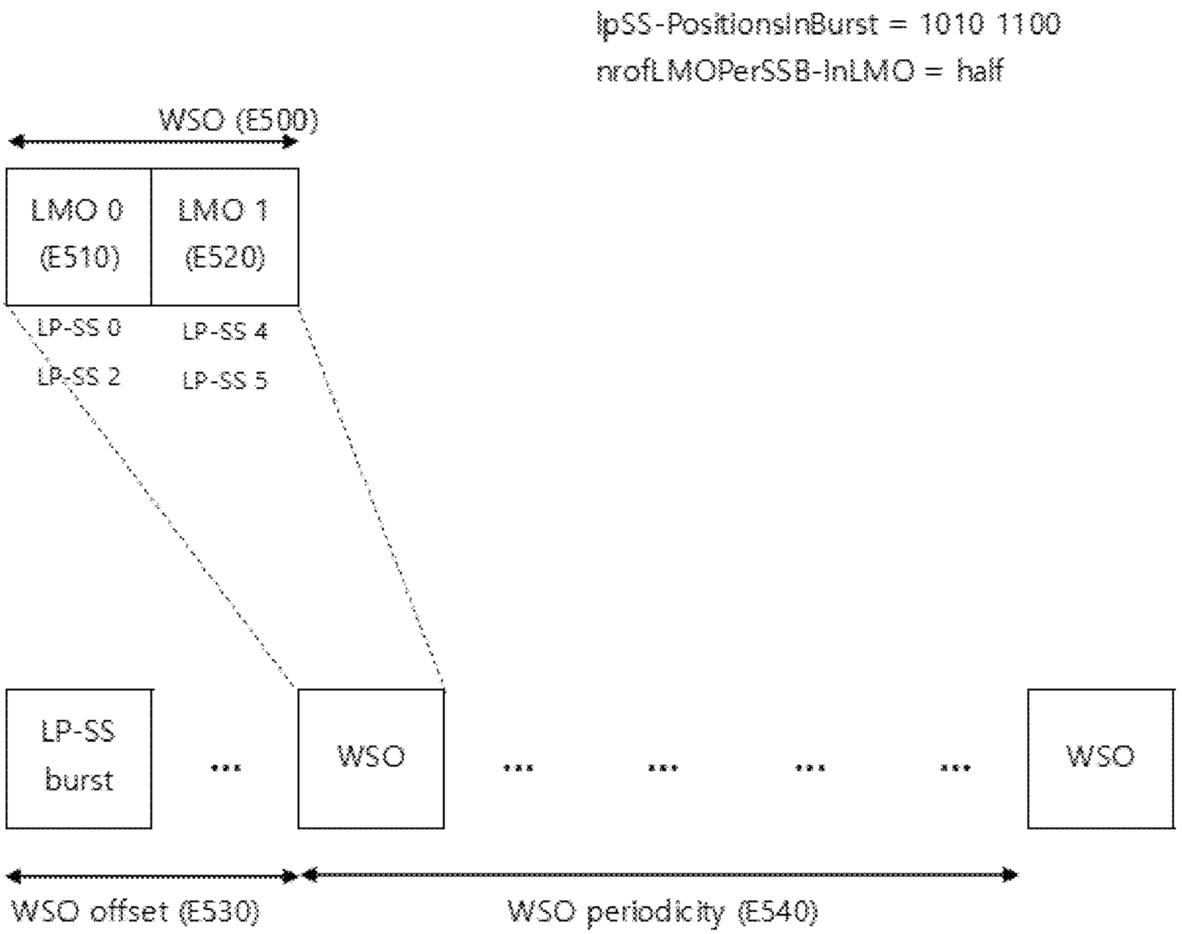
FIG. 11 illustrates L-DRX operations.

FIG. 11 illustrates L-DRX operations.

<L-DRX>

A WSO (LP-WUS occasion; or LMO burst) is a set of 'S*X' consecutive LMO (LP-WUS monitoring occasions) where 'S' is the number of actual transmitted LP-SSs determined according to lpSS-PositionsInBurst in SIB1 (or in RRCReconfiguration message) and X is the nrofLMOPerSSB-InLMO if configured or is equal to 1 otherwise. The $[x*S+K]^{th}$ LMO in the WSO corresponds to the $K^{th}$ transmitted SSB, where x=0, 1, . . . , X−1, K=0.5, 1, 2, . . . , S. The LMOs which do not overlap with UL symbols (determined according to tdd-UL-DL-ConfigurationCommon) are sequentially numbered from zero starting from the first LMO in the WSO.

A WSO is associated with a LP-SS burst. The starting time point of WSO is determined based on WSO_offset E530. Alternatively, the starting time point of WSO is determined based on WSO_starting_offset.

WSO occurs periodically based on WSO_periodicity E540.

For example, LMO 0 E510 of a WSO E500 corresponds to first transmitted LP-SS (LP-SS 0) and second transmitted LP-SS (LP-SS 2). LMO 1 E520 corresponds to third transmitted LP-SS (LP-SS 4) and fourth transmitted LP-SS (LP-SS 5).

If H-DRX is configured for the UE, UE performs L-DRX when it operates LR sub-mode.

UE monitors in a specific downlink carrier at least one LMO every WSO periodicity. UE is not required to receive any downlink MR signals from any serving cells in L-DRX (or in LR sub-mode).

<CELL-DTX1>

Fand each Serving Cell that is second type cell,

>: UE monitors PDCCH of the Serving Cell in Period_1 and in Period_2_2;

>: UE monitors PDCCH of SpCell in Period_1, in Period_2_2 and in Period 2_3; and >: UE is not required to monitor PDCCH of the Serving Cell in Period_2_1 and in Period_3 and in Period_4.

<CELL-DTX2>

Fand each Serving Cell that is second type cell,

>: UE monitors PDCCH of a second type cell that is not SpCell in Period_11_1 and in Period_12_2;

>: UE monitors PDCCH of SpCell in Period_11_1 and in Period_11_2 and in Period_12_2 and in Period_12_3;

>: UE monitors LP-WUS in Period_13 (if configured); and

>: UE is not required to monitor PDCCH of the Serving Cell in Period_12_1 and in Period_13 and in Period_14.

Switching Between Modes/Operations

Overview

When in MR mode:

>: C-DRX is applied to first type cells.

>: CELL-DTX1 is applied to second type cells.

>: MR mode operation is applied to serving cells regardless of whether the serving cells are in AT or in NAT.

When in HR mode:

>: H-DRX is applied to first type cells.

>: CELL-DTX2 is applied to second type cells.

>: LR sub-mode operation is applied to SpCell in case that the UE is in NHAT.

>: MR sub-mode operation is applied to serving cells in case that the UE is in HAT.

Alternatively, when in HR mode:

>: For first type cells:

>>: L-DRX is applied when UE operates in LR sub-mode; and

>>: C-DRX is applied when UE operates in MR sub-mode;

>: For second type cells:

>>: L-DRX is applied when UE operates in LR sub-mode; and

>>: CELL-DTX1 is applied when UE operates in MR sub-mode;

<Mode Change>

Mode switch from MR mode to HR mode is performed by instructed change that is based on a specific RRC message that sets up HR mode E130.

Mode switch from HR mode to MR mode is performed by

>: instructed change that is based on a specific RRC message that release HR mode E140; or >: autonomous mode change that is based on LP-SS RSRP being lower than a configured threshold.

<Sub-Mode Change>

When UE is in HR mode, switching between sub-modes are performed.

UE switches from LR sub-mode to MR sub-mode:

>: based on instructed change, wherein:

>>: LP-WUS with valid indication is detected (and minimum-durationTimer starts); or >>: CSI transmission on PUCCH/PUSCH is scheduled; or >: based on autonomous sub-mode change, wherein:

>>: LP-SS RSRP becomes lower than a configured threshold; or

>>: random access is triggered due to new uplink data arrival.

UE switches from MR sub-mode to LR sub-mode in case that:

>: minimum-durationTimer expires (and UE is neither scheduled nor system information update is indicated);

>: additional-durationTimer expires; or

>: LR-mode-change MAC CE is received.

During LR sub-mode, upon new uplink data arrival, UE does not trigger SR but trigger random access.

During MR sub-mode, upon new uplink data arrival, UE triggers SR.

LR-mode-change MAC CE has a fixed size of zero bits. The MAC CE is identified by a MAC subheader with a first LCID field and a second LCID field. The first LCID field is set to a first value and the second LCID field is set to a second value. The first value indicates that the second LCID field is present. The second value indicates that the MAC CE is LR-mode-change MAC CE.

If the MAC CE is received, UE performs sub-mode change from MR sub-mode to LR sub-mode:

>: at first time point in case that neither first_event nor second event nor third event is ongoing;

>: at second time point in case that either first_event or second_event or third_event is ongoing.

UE stops the minimum_durationTimer if ongoing. UE stops the additional_durationTimer if ongoing.

The first time point is at n+x slot, when HARQ ACK for the MAC CE is transmitted at slot n. x is fixed.

The second time point is when ongoing first_event or second_event or third_event is completed.

LP-WUS contains a bitmap. Each bit of the bitmap corresponds to a subgroup. The first bit corresponds to subgroup 0, the second bit corresponds to subgroup 1 and so on. UE is assigned to one of the subgroup by RRC message. When UE receives LP-WUS with the bit corresponding to UE's subgroup set to 1, UE considers valid indication is received and performs sub-mode change to MR sub-mode.

Terminologies

<Period_x>

Period_1 [(AT_1 or AT_3 or AT_4) and AP]

>>: the DRX group of the Serving Cell is in Active Time due to first_event third_event or fourth_event; and >>: the serving cell is in the cell DTX Active Period.

Period_2_1 [AT_4 and NAP]

>>: the DRX group of the Serving Cell is in Active Time due to fourth_event; and >>: the serving cell is not in the cell DTX Active Period.

Period_2_2 [(AT_1 or AT_3) and NAP]

>>: the DRX group of the Serving Cell is in Active Time due to first_event third_event; and >>: the serving cell is not in the cell DTX Active Period.

Period_2_3 [AT_2 and NAP]

>>: the DRX group of the Serving Cell is either in in Active Time due to second_event; and >>: the serving cell is not in the cell DTX Active Period.

Period_3 [NAT and AP]

>>: the DRX group of the Serving Cell is not in Active Time; and

>>: the serving cell is in the cell DTX Active Period.

Period_4 [NAT and NAP]

>>: the DRX group of the Serving Cell is not in Active Time; and

>>: the serving cell is not in the cell DTX Active Period.

Period_11_1 [(HAT_1 or HAT_2 or HAT_3 or HAT_5) and AP]

>>: The second type cells of the UE are in Hybrid Active Time due to first_event or second_event or third_event or fifth_event or sixth_event; and >>: the serving cell is in the cell DTX Active Period.

Period_11_2 [HAT_6 and AP]

>>: The second type cells of the UE are in Hybrid Active Time due to first_event or second_event or third_event or fifth_event or sixth_event; and >>: the serving cell is in the cell DTX Active Period.

Period_12_1 [(HAT_5 or HAT_6) and NAP]

>>: The second type cells of the UE are in Hybrid Active Time due to fifth_event or sixth_event; and >>: the serving cell is not in the cell DTX Active Period.

Period_12_2 [(HAT_1 or HAT_3) and NAP]

>>: The second type cells of the UE are in Hybrid Active Time due to first_event or third_event; and >>: the serving cell is not in the cell DTX Active Period.

Period_12_3 [HAT_2 and NAP]

>>: The second type cells of the UE are in Hybrid Active Time due to second_event; and >>: the serving cell is not in the cell DTX Active Period.

Period 13 (NHAT and AP)

>>: The second type cells of the UE are not in Hybrid Active Time; and

>>: the serving cell is in the cell DTX Active Period.

Period 14 (NHAT and NAP)

>>: The second type cells of the UE are not in Hybrid Active Time; and

>>: the serving cell is not in the cell DTX Active Period.

<Tasks>

Scheduling-related task 1 (ST1): monitoring PDCCH for the corresponding serving cell or on the corresponding serving cell & receiving PDSCH based on the PDCCH via MR.

Scheduling-related task 2 (ST2): receiving PDSCH based on configured assignment on the corresponding serving cell via MR.

Scheduling-related task 3 (ST3): receiving LP-WUS via LR.

Measurement-related task 1 (MT1): measuring (evaluating quality of) specific synchronization signals of the corresponding serving cell via MR.

Measurement-related task 2 (MT2): measuring (evaluating quality of) specific reference signals of the corresponding serving cell via MR.

Measurement-related task 3 (MT3): measuring (evaluating quality of) specific reference signals or specific reference signals (configurable) of the non-serving cells (neighboring cells) via MR.

Measurement-related task 4 (MT4): measuring (evaluating quality of) specific synchronization signals (e.g. LP-SS) of the PCell via LR.

For each receiver-specific operation, tasks that UE should perform are determined based on relevant ON/OFF schemes.

<Events>

First_event is ongoing while:

>: FE1: ContentionResolutionTimer (as described in clause 5.1.5) or msgB-ResponseWindow (as described in clause 5.1.4a) is running; or >: FE2: Scheduling Request is sent on PUCCH and is pending (as described in clause 5.4.4 or 5.22.1.5). If this Serving Cell is part of a non-terrestrial network, the Active Time is started after the Scheduling Request transmission that is performed when the SR_COUNTER is 0 for all the SR configurations with pending SR(s) plus the UE-gNB RTT; or >: FE3: PDCCH indicating a new transmission addressed to the C-RNTI of the MAC entity has not been received after successful reception of a Random Access Response for the Random Access Preamble not selected by the MAC entity among the contention-based Random Access Preamble (as described in clauses 5.1.4 and 5.1.4a); or >: FE4: there is an ongoing RACH-less LTM cell switch; or >: FE5: there is an ongoing RACH-less handover in a terrestrial network.

Second_event is ongoing while:

>: ra-ResponseWindow is running

Third_event is ongoing for a DRX group while:

>: any drx-RetransmissionTimerDL, drx-Retransmission-TimerUL or drx-RetransmissionTimerSL (as described in TS 38.321 clause 5.7) is running on any Serving Cell in the DRX group of this Serving Cell.

Fourth_event is ongoing for a DRX group while:

>: drx-onDurationTimer or drx-InactivityTimer configured for the DRX group is running.

Fifth_event is ongoing for a UE while:

>: minimum-durationTimer is running.

Sixth_event is ongoing for a UE while:

>: additional-durationTimer is running.

<MR_DL_RX>

>: In MR mode:

>>: MR_DL_RX_SCHEDULE comprises followings:

>>>: Active serving cells (PCell and Activated SCells).

>>: MR_DL_RX_MEASURE comprises followings:

>>>: Active serving cells;

>>>: deactivated SCells;

>>>: intra-frequency neighboring cells; and

>>>: inter-frequency neighboring cells.

>: In Hybrid mode:

>>: MR_DL_RX_SCHEDULE comprises followings:

>>>: Active serving cells (PCell and Activated SCells).

>>: MR_DL_RX_MEASURE comprises followings:

>>>: Active serving cells; and

>>>: deactivated SCells.

Figure 12:
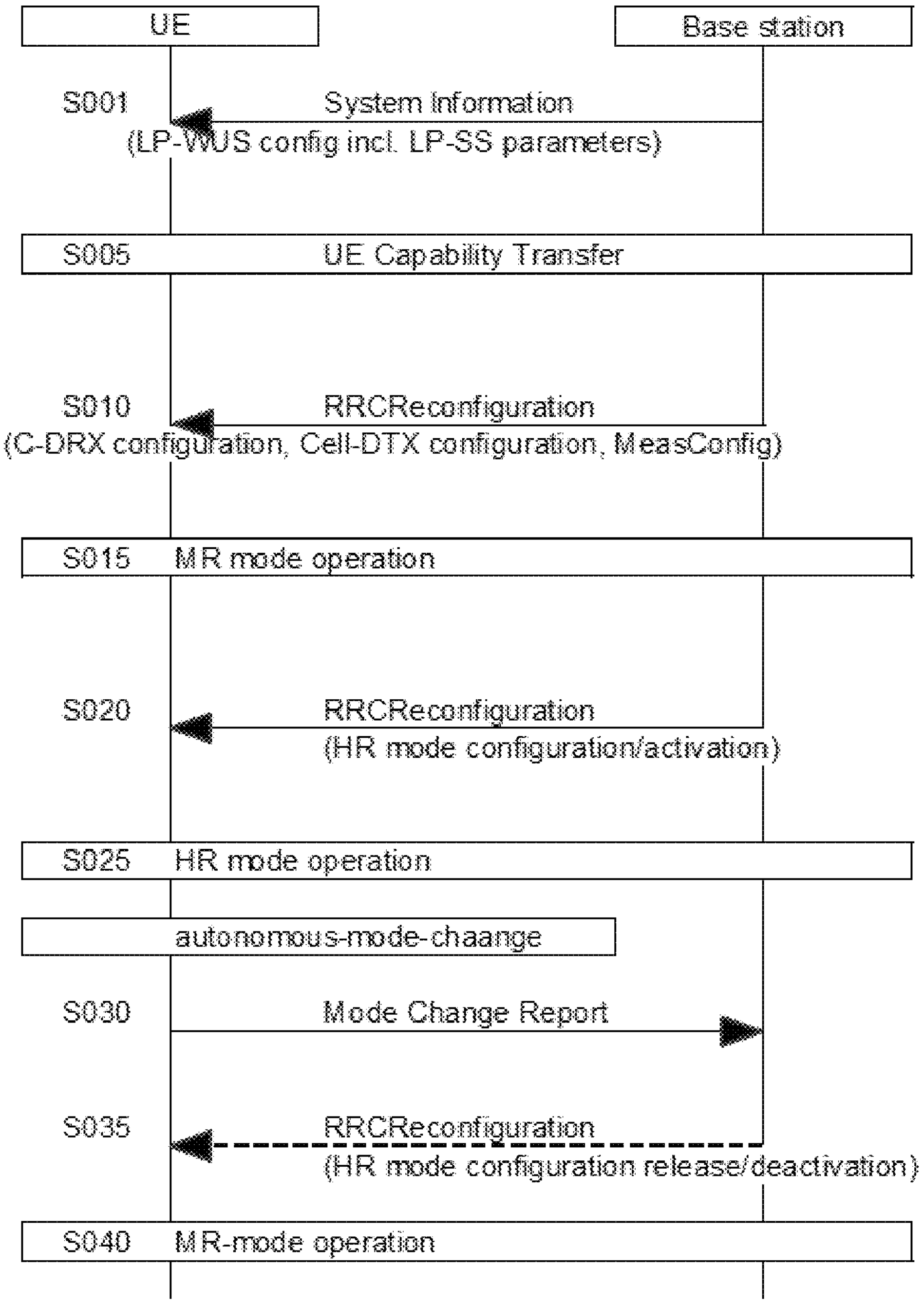
FIG. 12 illustrates operations of UE and base station.

FIG. 12 illustrates operations of UE and base station.

UE receives from the base station a system information at S001. The system information may comprise LP-WUS-Config IE and LP-SS-Config IE.

LP-SS-Config IE comprises LP-SS-AbsoluteFrequency field, LP-SS-BandWidth field, LP-SS_SSB_mappingList IE and LP-SS-PositionsInBurst IE.

In case that LP-SS-PositionsInBurst IE is absent, UE determines which LP-SS is transmitted based on ssb-positionInBurst and LP-SS_SSB_mapping IE.

UE and the base station perform UE capability transfer at S005. UE transmits to the base station a UECapabilityInformation message. The UECapabilityInformation comprises:

>: list of band combinations that are supported by the UE for NR communication;

>: For each band combination in the list:

>>: indication whether H-DRX/HR-mode is supported by the UE;

>>: information on which band of the band combination, L-DRX/LR sub-mode is supported by the UE.

The base station transmits to the UE a RRCReconfiguration message at S010. The RRCReconfiguration message comprises various configuration parameters.

RRCReconfiguration message comprises CellGroupConfig IE and MeasConfig IE.

CellGroupConfig IE A110 comprises MAC-CellGroupConfig IE, SpCellConfig IE and zero or more SCellConfig IEs. SpCellConfig IE comprises configuration parameters for SpCell. SCellConfig IE comprises configuration parameters for SCell.

SpCellConfig IE and SCellConfig IE comprise:

>: ServingCellConfigCommon IE A120;

>: ServingCellConfig IE A130;

>: SSB-MTC IE.

SpCellConfig IE comprises ServCellIndex IE and SCellConfig IE comprises SCellIndex IE.

The IE ServCellIndex concerns a short identity, used to uniquely identify a serving cell (i.e. the PCell, the PSCell or an SCell) across the cell groups. Value 0 applies for the PCell, while the SCellIndex that has previously been assigned applies for SCells.

ServCellIndex::=INTEGER (0 . . . 31)

The IE SCellIndex concerns a short identity, used to identify an SCell. The value range is shared across the Cell Groups.

SCellIndex::=INTEGER (1 . . . 31)

ServingCellConfigCommon IE 2G20 comprises cell specific parameters. It comprises:

>: PhysCellId IE;

>: DownlinkConfigCommon IE

>: UplinkConfigCommon IE

>: ssb-PositionsInBurst IE

ServingCellConfig IE 2G30 comprises UE specific parameters for the corresponding serving cell. It comprises:

>: (1 . . . maxNrofBWPs) OF BWP-Downlink

>: (1 . . . maxNrofBWPs) OF BWP-Uplink

>: TCI-ActivatedConfig

>: CellDTX-DRX-Config

MAC-CellGroupConfig IE comprises configuration parameters for MAC configuration. It comprises:

>: DRX-Config IE (that comprise configuration parameters for C-DRX);

>: DRX-ConfigSecondaryGroup IE (that comprise configuration parameters for secondary DRX group) A150

The IE DRX-Config A140 is used to configure DRX related parameters.

drx-HARQ-RTT-TimerDL indicates value in number of symbols of the BWP where the transport block was received. drx-HARQ-RTT-TimerDL-r17 is only applicable for SCS 480 kHz and 960 kHz. If configured, the UE shall ignore drx-HARQ-RTT-TimerDL (without suffix) for SCS 480 kHz and 960 kHz.

drx-HARQ-RTT-TimerUL indicates value in number of symbols of the BWP where the transport block was transmitted. drx-HARQ-RTT-TimerUL-r17 is only applicable for SCS 480 kHz and 960 kHz. If configured, the UE shall ignore drx-HARQ-RTT-TimerUL (without suffix) for SCS 480 kHz and 960 kHz.

drx-InactivityTimer indicates value in multiple integers of 1 ms. ms0 corresponds to 0, ms1 corresponds to 1 ms, ms2 corresponds to 2 ms, and so on.

drx-LongCycleStartOffset indicates drx-LongCycle in ms and drx-StartOffset in multiples of 1 ms. If drx-ShortCycle is configured, the value of drx-LongCycle shall be a multiple of the drx-ShortCycle value.

drx-NonIntegerLongCycleStartOffset indicates drx-NonIntegerLongCycle in non-integer number of ms (e.g. ms1001over240 corresponds to 1001/240 ms, ms25over6 corresponds to 25/6 ms and so on) and drx-StartOffset in multiples of 1 ms. If drx-NonIntegerShortCycle is configured, the value of drx-NonIntegerLongCycle shall be a multiple of the drx-NonIntegerShortCycle value. If drx-NonIntegerLongCycleStartOffset-r18 is configured, the UE shall ignore drx-LongCycleStartOffset.

drx-NonIntegerShortCycle indicates value in non-integer number of ms, e.g. ms1001over240 corresponds to 1001/240 ms, ms25over6 corresponds to 25/6 ms and so on.

drx-onDurationTimer indicates value in multiples of 1/32 ms (subMilliSeconds) or in ms (milliSecond). For the latter, value ms1 corresponds to 1 ms, value ms2 corresponds to 2 ms, and so on.

drx-RetransmissionTimerDL indicates value in number of slot lengths of the BWP where the transport block was received. value sl0 corresponds to 0 slots, sl1 corresponds to 1 slot, sl2 corresponds to 2 slots, and so on.

drx-RetransmissionTimerUL indicates value in number of slot lengths of the BWP where the transport block was transmitted. sl0 corresponds to 0 slots, sl1 corresponds to 1 slot, sl2 corresponds to 2 slots, and so on.

drx-ShortCycleTimer indicates value in multiples of drx-ShortCycle or drx-NonIntegerShortCycle (depending on which one is configured). A value of 1 corresponds to drx-ShortCycle or drx-NonIntegerShortCycle, a value of 2 corresponds to 2*drx-ShortCycle or 2*drx-NonIntegerShortCycle and so on.

drx-ShortCycle indicates value in ms. ms1 corresponds to 1 ms, ms2 corresponds to 2 ms, and so on.

drx-SlotOffset indicates value in 1/32 ms. Value 0 corresponds to 0 ms, value 1 corresponds to 1/32 ms, value 2 corresponds to 2/32 ms, and so on.

drx-TimeReferenceSFN indicates how the UE initializes the counter DRX_SFN_COUNTER.

shortDRX indicates configuration of a short DRX cycle.

The IE CellDTX-DRX-Config A160 is used to configure cell DTX/DRX related parameters.

cellDTX-DRX-CycleStartOffset field indicates cellDTX-DRX-Cycle in ms and cellDTX-DRX-StartOffset in multiples of 1 ms. The configured cellDTX-DRX-Cycle is an integer multiple of configured drx-longCycle or vice versa.

cellDTX-DRX-onDurationTimer indicates value in multiples of 1/32 ms (subMilliSeconds) or in ms (milliSecond). For the latter, value ms1 corresponds to 1 ms, value ms2 corresponds to 2 ms, and so on.

cellDTX-DRX-SlotOffset indicates value in 1/32 ms. Value 0 corresponds to 0 ms, value 1 corresponds to 1/32 ms, value 2 corresponds to 2/32 ms, and so on.

cellDTX-DRX-ActivationStatus indicates initial activation status of cell DTX/DRX indicating whether the UE shall activate the configuration according to the received parameters. This field is only used upon setup of a cell DTX/DRX configuration.

cellDTX-DRX-ConfigType indicates whether the configuration is for cell DTX only, cell DRX only, or joint cell DTX/DRX configuration.

At S015, UE and base station perform MR mode operation based on configuration parameters comprised in the RRCReconfiguration message.

<C-DRX Operation>

Serving Cells of a MAC entity may be configured by RRC in two DRX groups with separate DRX parameters. When RRC does not configure a secondary DRX group, there is only one DRX group and all Serving Cells belong to that one DRX group. When two DRX groups are configured, each Serving Cell is uniquely assigned to either of the two groups. The DRX parameters that are separately configured for each DRX group are: drx-onDurationTimer, drx-InactivityTimer. The DRX parameters that are common to the DRX groups are: drx-SlotOffset, drx-RetransmissionTimerDL, drx-RetransmissionTimerUL, drx-LongCycleStartOffset, drx-NonIntegerLongCycleStartOffset, drx-ShortCycle (optional), drx-NonIntegerShortCycle (optional), drx-ShortCycleTimer (optional), drx-HARQ-RTT-TimerDL, and drx-HARQ-RTT-TimerUL.

When DRX is configured, the Active Time for Serving Cells in a DRX group includes the time while:

>: drx-onDurationTimer or drx-InactivityTimer configured for the DRX group is running; or >: drx-RetransmissionTimerDL or drx-RetransmissionTimerUL is running on any Serving Cell in the DRX group; or >: ra-ContentionResolutionTimer (as described in TS 38.321 clause 5.1.5) or msgB-ResponseWindow (as described in TS 38.321 clause 5.1.4a) is running; or >: a Scheduling Request is sent on PUCCH and is pending (as described in TS 38.321 clause 5.4.4 or 5.22.1.5). If this Serving Cell is part of a non-terrestrial network, the Active Time is started after the Scheduling Request transmission that is performed when the SR_COUNTER is 0 for all the SR configurations with pending SR(s) plus the UE-gNB RTT; or >: a PDCCH indicating a new transmission addressed to the C-RNTI of the MAC entity has not been received after successful reception of a Random Access Response for the Random Access Preamble not selected by the MAC entity among the contention-based Random Access Preamble (as described in TS 38.321 clauses 5.1.4 and 5.1.4a); or >: there is an ongoing RACH-less LTM cell switch; or >: there is an ongoing RACH-less handover in a terrestrial network.

When DRX is configured, the MAC entity shall:

>: if a MAC PDU is received in a configured downlink assignment for unicast:

>>: if this Serving Cell is configured with downlinkHARQ-FeedbackDisabled:

>>>: if the corresponding HARQ process is configured with HARQ feedback enabled:

>>>>: set HARQ-RTT-TimerDL-NTN for the corresponding HARQ process equal to drx-HARQ-RTT-TimerDL plus the latest available UE-gNB RTT value;

>>>>: start the HARQ-RTT-TimerDL-NTN for the corresponding HARQ process in the first symbol after the end of the corresponding transmission carrying the DL HARQ feedback.

>>: else:

>>>: start the drx-HARQ-RTT-TimerDL for the corresponding HARQ process in the first symbol after the end of the corresponding transmission carrying the DL HARQ feedback.

>>: stop the drx-RetransmissionTimerDL for the corresponding HARQ process;

>>: stop the drx-RetransmissionTimerDL-PTM for the corresponding HARQ process.

>: if a MAC PDU is transmitted in a configured uplink grant and LBT failure indication is not received from lower layers:

>>: if this Serving Cell is configured with uplinkHARQ-Mode:

>>>: if the corresponding HARQ process is configured as HARQModeA:

>>>>: set HARQ-RTT-TimerUL-NTN for the corresponding HARQ process equal to drx-HARQ-RTT-TimerUL plus the latest available UE-gNB RTT value;

>>>>: if drx-LastTransmissionUL is configured:

>>>>>: start the HARQ-RTT-TimerUL-NTN for the corresponding HARQ process in the first symbol after the end of the last transmission (within a bundle) of the corresponding PUSCH transmission.

>>>>: else:

>>>>>: start the HARQ-RTT-TimerUL-NTN for the corresponding HARQ process in the first symbol after the end of the first transmission (within a bundle) of the corresponding PUSCH transmission.

>>: else:

>>>: if disableCG-RetransmissionMonitoring is not configured for the configured uplink grant:

>>>>: if drx-LastTransmissionUL is configured:

>>>>>: start the drx-HARQ-RTT-TimerUL for the corresponding HARQ process in the first symbol after the end of the last transmission (within a bundle) of the corresponding PUSCH transmission.

>>>>: else:

>>>>>: start the drx-HARQ-RTT-TimerUL for the corresponding HARQ process in the first symbol after the end of the first transmission (within a bundle) of the corresponding PUSCH transmission.

>>: stop the drx-RetransmissionTimerUL for the corresponding HARQ process at the first transmission (within a bundle) of the corresponding PUSCH transmission.

>: if a MAC PDU is transmitted in a configured sidelink grant:

>>: if the PUCCH resource is configured:

>>>: start the drx-HARQ-RTT-TimerSL for the corresponding HARQ process in the first symbol after the end of the corresponding PUCCH transmission carrying the SL HARQ feedback; or >>>: start the drx-HARQ-RTT-TimerSL for the corresponding HARQ process in the first symbol after the end of the corresponding PUCCH resource for the SL HARQ feedback when the PUCCH is not transmitted;

>>>: stop the drx-RetransmissionTimerSL for the corresponding HARQ process.

>>: else:

>>>: start the drx-HARQ-RTT-TimerSL for the corresponding HARQ process at the first symbol after the end of the corresponding PSSCH transmission;

>>>: stop the drx-RetransmissionTimerSL for the corresponding HARQ process.

>: if a drx-HARQ-RTT-TimerDL expires:

>>: if the data of the corresponding HARQ process was not successfully decoded:

>>>: start the drx-RetransmissionTimerDL for the corresponding HARQ process in the first symbol after the expiry of drx-HARQ-RTT-TimerDL.

>: if a HARQ-RTT-TimerDL-NTN expires:

>>: if the data of the corresponding HARQ process was not successfully decoded:

>>>: start the drx-RetransmissionTimerDL for the corresponding HARQ process in the first symbol after the expiry of HARQ-RTT-TimerDL-NTN.

>: if a drx-HARQ-RTT-TimerUL expires:

>>: start the drx-RetransmissionTimerUL for the corresponding HARQ process in the first symbol after the expiry of drx-HARQ-RTT-TimerUL.

>: if a HARQ-RTT-TimerUL-NTN expires:

>>: start the drx-RetransmissionTimerUL for the corresponding HARQ process in the first symbol after the expiry of HARQ-RTT-TimerUL-NTN.

>: if a drx-HARQ-RTT-TimerSL expires:

>>: if a HARQ NACK feedback for the corresponding HARQ process is transmitted on PUCCH; or >>: if a HARQ NACK feedback for the corresponding HARQ process is generated but not transmitted on PUCCH; or >>: if the PUCCH resource is not configured for the SL grant:

>>>: start the drx-RetransmissionTimerSL for the corresponding HARQ process in the first symbol after the expiry of drx-HARQ-RTT-TimerSL.

>: if a DRX Command MAC CE indicated by PDCCH addressed to C-RNTI or CS-RNTI, or by a configured downlink assignment for unicast transmission or a Long DRX Command MAC CE is received:

>>: stop drx-onDurationTimer for each DRX group;

>>: stop drx-InactivityTimer for each DRX group.

>: DownlinkConfigCommon IE

>: if drx-InactivityTimer for a DRX group expires:

>>: if the Short DRX cycle is configured:

>>>: start or restart drx-ShortCycleTimer for this DRX group in the first symbol after the expiry of drx-InactivityTimer;

>>>: use the Short DRX cycle for this DRX group.

>>: else:

>>>: use the Long DRX cycle for this DRX group.

>: if a DRX Command MAC CE indicated by PDCCH addressed to C-RNTI or CS-RNTI, or by a configured downlink assignment for unicast transmission is received:

>>: if the Short DRX cycle is configured:

>>>: start or restart drx-ShortCycleTimer for each DRX group in the first symbol after the end of DRX Command MAC CE reception;

>>>: use the Short DRX cycle for each DRX group.

>>: else:

>>>: use the Long DRX cycle for each DRX group.

>: if drx-ShortCycleTimer for a DRX group expires:

>>: use the Long DRX cycle for this DRX group.

>: if a Long DRX Command MAC CE is received:

>>: stop drx-ShortCycleTimer for each DRX group;

>>: use the Long DRX cycle for each DRX group.

>: if the drx-NonIntegerLongCycleStartOffset is configured:

>>: increment DRX_SFN_COUNTER by 1 in the first symbol of a slot in which SFN changes to 0;

>>: if DRX is (re-)configured by RRC:

>>>: if drx-TimeReferenceSFN is included in the RRC (re-)configuration which is received during the first half of a hyper frame (i.e., SFN is between 0 and 511):

>>>>: set DRX_SFN_COUNTER to 1.

>>>: else:

>>>>: set DRX_SFN_COUNTER to 0.

>: if the Short DRX cycle is used for a DRX group and the drx-NonIntegerShortCycle is not configured, and [(SFN×10)+subframe number] modulo (drx-ShortCycle)=(drx-StartOffset) modulo (drx-ShortCycle); or >: if the Short DRX cycle is used for a DRX group and the drx-NonIntegerShortCycle is configured, and floor([(DRX_SFN_COUNTER×10240)+(SFN×10)+subframe number−drx-StartOffset] modulo (drx-NonIntegerShortCycle))=0:

>>: start drx-onDurationTimer for this DRX group after drx-SlotOffset from the beginning of the subframe.

>: if the Long DRX cycle is used for a DRX group and the drx-NonIntegerLongCycleStartOffset is not configured, and [(SFN×10)+subframe number] modulo (drx-LongCycle)=drx-StartOffset; or >: if the Long DRX cycle is used for a DRX group and the drx-NonIntegerLongCycleStartOffset is configured, and floor([(DRX_SFN_COUNTER×10240)+(SFN×10)+subframe number] modulo (drx-NonIntegerLongCycle))=drx-StartOffset:

>>: if DCP monitoring is configured for the active DL BWP as specified in TS 38.213 [6], clause 10.3:

>>>: if DCP indication associated with the current DRX cycle received from lower layer indicated to start drx-onDurationTimer, as specified in TS 38.213 [6]; or >>>: if all DCP occasion(s) in time domain, as specified in TS 38.213 [6], associated with the current DRX cycle occurred in Active Time considering grants/assignments/DRX Command MAC CE/Long DRX Command MAC CE received and Scheduling Request sent until 4 ms prior to start of the last DCP occasion, or during a measurement gap, or when the MAC entity monitors for a PDCCH transmission on the search space indicated by recoverySearchSpaceId of the SpCell identified by the C-RNTI while the ra-ResponseWindow is running (as specified in clause 5.1.4); or >>>: if ps-Wakeup is configured with value true and DCP indication associated with the current DRX cycle has not been received from lower layers:

>>>>: start drx-onDurationTimer after drx-SlotOffset from the beginning of the subframe.

>>: else:

>>>: start drx-onDurationTimer for this DRX group after drx-SlotOffset from the beginning of the subframe.

>: if a DRX group is in Active Time:

>>: monitor the PDCCH on the Serving Cells in this DRX group as specified in TS 38.213 [6];

>>: if the PDCCH indicates a DL transmission; or

>>: if the PDCCH indicates a one-shot HARQ feedback as specified in clause 9.1.4 of TS 38.213 [6]; or >>: if the PDCCH indicates a retransmission of HARQ feedback as specified in clause 9.1.5 of TS 38.213 [6]:

>>>: if this Serving Cell is configured with downlinkHARQ-FeedbackDisabled:

>>>>: if at least one of the corresponding HARQ process(es) is configured with HARQ feedback enabled:

>>>>>: set HARQ-RTT-TimerDL-NTN for the corresponding HARQ process(es) equal to drx-HARQ-RTT-TimerDL plus the latest available UE-gNB RTT value;

>>>>>: if the UE is configured with one-shot HARQ Feedback:

>>>>>>: start or restart the HARQ-RTT-TimerDL-NTN for the corresponding HARQ process(es) whose HARQ feedback is enabled and reported in the first symbol after the end of the corresponding transmission carrying the DL HARQ feedback.

>>>>>: else:

>>>>>>: start the HARQ-RTT-TimerDL-NTN for the corresponding HARQ process in the first symbol after the end of the corresponding transmission carrying the DL HARQ feedback.

>>>: else:

>>>>: start or restart the drx-HARQ-RTT-TimerDL for the corresponding HARQ process(es) whose HARQ feedback is reported in the first symbol after the end of the corresponding transmission carrying the DL HARQ feedback.

>>>: stop the drx-RetransmissionTimerDL for the corresponding HARQ process(es) whose HARQ feedback is reported;

>>>: stop the drx-RetransmissionTimerDL-PTM for the corresponding HARQ process;

>>>: if the PDSCH-to-HARQ_feedback timing indicate an inapplicable k1 value as specified in TS 38.213 [6]:

>>>>: start the drx-RetransmissionTimerDL in the first symbol after the (end of the last) PDSCH transmission (within a bundle) for the corresponding HARQ process.

>: DownlinkConfigCommon IE

>>: if the PDCCH indicates a UL transmission:

>>>: if this Serving Cell is configured with uplinkHARQ-Mode:

>>>>: if the corresponding HARQ process is configured as HARQModeA:

>>>>>: set HARQ-RTT-TimerUL-NTN for the corresponding HARQ process equal to drx-HARQ-RTT-TimerUL plus the latest available UE-gNB RTT value;

>>>>>: if drx-LastTransmissionUL is configured:

>>>>>>: start the HARQ-RTT-TimerUL-NTN for the corresponding HARQ process in the first symbol after the end of the last transmission (within a bundle) of the corresponding PUSCH transmission.

>>>>>: else:

>>>>>>: start the HARQ-RTT-TimerUL-NTN for the corresponding HARQ process in the first symbol after the end of the first transmission (within a bundle) of the corresponding PUSCH transmission.

>>>: else:

>>>>: if drx-LastTransmissionUL is configured:

>>>>>: start the drx-HARQ-RTT-TimerUL for the corresponding HARQ process in the first symbol after the end of the last transmission (within a bundle) of the corresponding PUSCH transmission.

>>>>: else:

>>>>>: start the drx-HARQ-RTT-TimerUL for the corresponding HARQ process in the first symbol after the end of the first transmission (within a bundle) of the corresponding PUSCH transmission.

>>>: stop the drx-RetransmissionTimerUL for the corresponding HARQ process.

>: if DCP monitoring is configured for the active DL BWP as specified in TS 38.213 [6], clause 10.3; and >: if the current symbol n occurs within drx-onDurationTimer duration; and >: if drx-onDurationTimer associated with the current DRX cycle is not started as specified in this clause:

>>: if the MAC entity would not be in Active Time considering grants/assignments/DRX Command MAC CE/Long DRX Command MAC CE received and Scheduling Request sent until 4 ms prior to symbol n when evaluating all DRX Active Time conditions as specified in this clause; and >>: if allowCSI-SRS-Tx-MulticastDRX-Active is not configured, or if cfr-ConfigMulticast is not configured for any of the active BWP(s) of the Serving Cell(s), or if all multicast DRXes would not be in Active Time considering multicast assignments/DRX Command MAC CE for MBS multicast received until 4 ms prior to symbol n when evaluating all DRX Active Time conditions as specified in Clause 5.7b and all multicast sessions are configured with multicast DRX:

>>>: not transmit periodic SRS and semi-persistent SRS defined in TS 38.214 [7];

>>>: not report semi-persistent CSI configured on PUSCH;

>>>: not report semi-persistent CSI on PUCCH;

>>>: if ps-TransmitPeriodicL1-RSRP is not configured with value true:

>>>>: not report periodic CSI that is L1-RSRP on PUCCH.

>>>: if ps-TransmitOtherPeriodicCSI is not configured with value true:

>>>>: not report periodic CSI that is not L1-RSRP on PUCCH.

>: else:

>>: in current symbol n, if a DRX group would not be in Active Time considering grants/assignments scheduled on Serving Cell(s) in this DRX group and DRX Command MAC CE/Long DRX Command MAC CE received and Scheduling Request sent until 4 ms prior to symbol n when evaluating all DRX Active Time conditions as specified in this clause; and >>: if allowCSI-SRS-Tx-MulticastDRX-Active is not configured, or if cfr-ConfigMulticast is not configured for any of the active BWP(s) of the Serving Cell(s), or, in current symbol n, if all multicast DRXes corresponding to the DRX group would not be in Active Time considering multicast assignments/DRX Command MAC CE for MBS multicast received until 4 ms prior to symbol n when evaluating all DRX Active Time conditions as specified in Clause 5.7b and all multicast sessions corresponding to the DRX group are configured with multicast DRX:

>>>: not transmit periodic SRS and semi-persistent SRS defined in TS 38.214 [7] in this DRX group;

>>>: not report CSI on PUCCH and semi-persistent CSI configured on PUSCH in this DRX group.

>>: if CSI masking (csi-Mask) is setup by upper layers:

>>>: in current symbol n, if drx-onDurationTimer of a DRX group would not be running considering grants/assignments scheduled on Serving Cell(s) in this DRX group and DRX Command MAC CE/Long DRX Command MAC CE received until 4 ms prior to symbol n when evaluating all DRX Active Time conditions as specified in this clause; and >>>: if allowCSI-SRS-Tx-MulticastDRX-Active is not configured, or if cfr-ConfigMulticast is not configured for any of the active BWP(s) of the Serving Cell(s), or, in current symbol n, if drx-onDurationTimerPTM(s) of all multicast DRXes corresponding to the DRX group would not be running considering DRX Command MAC CE for MBS multicast received until 4 ms prior to symbol n when evaluating all DRX Active Time conditions as specified in Clause 5.7b and all multicast sessions corresponding to the DRX group are configured with multicast DRX:

>>>>: not report CSI on PUCCH in this DRX group.

MAC entity shall ensure no rounding error is generated when performing the modulus operation with drx-NonIntegerShortCycle or drx-NonIntegerLongCycle as the divisor.

Regardless of whether the MAC entity is monitoring PDCCH or not on the Serving Cells in a DRX group, the MAC entity transmits HARQ feedback, aperiodic CSI on PUSCH, and aperiodic SRS defined in TS 38.214 [7] on the Serving Cells in the DRX group when such is expected.

The MAC entity needs not to monitor the PDCCH if it is not a complete PDCCH occasion (e.g. the Active Time starts or ends in the middle of a PDCCH occasion).

When drx-LastTransmissionUL is configured, drx-HARQ-RTT-TimerUL or HARQ-RTT-TimerUL-NTN is started after the last PUSCH transmission occasion of a bundle regardless of whether that last PUSCH transmission occasion is used for a PUSCH transmission for that bundle or not.

<CELL-DTX1 Operation>

In this clause, serving cell can be second type cell.

CELL-DTX1 is applied to a serving cell in case that:

>: Cell DTX operation is configured for the serving cell; and

>: H-DRX is not configured for the UE.

Cell DTX is configured for a serving cell if cellDTX-DRX-ConfigType is set to dtx or dtxdrx. Cell DTX operation is activated and deactivated for each second type cell:

>: receiving a cell DTX indication from lower layers indicating activation or deactivation of cell DTX operation, as specified in TS 38.213 [6];

>: configuring cellDTX-DRX-Config by upper layers: if cell DTX is configured and cellDTX-DRX-ActivationStatus is set to activated, cell DTX operation is activated upon cell DTX configuration; if cell DTX is configured and cellDTX-DRX-ActivationStatus is set to deactivated, cell DTX operation is deactivated upon cell DTX configuration; if cellDTX-DRX-Config is released, cell DTX operation is deactivated and all the corresponding configurations are released.

When cell DTX is configured and activated for a second type cell, the cell DTX Active Period includes the time while:

>: cellDTX-DRX-onDurationTimer is running for the associated Serving Cell.

For each Serving Cell configured with cell DTX, the MAC entity shall:

>: if cell DTX is activated for this Serving Cell:

>>: if [(SFN×10)+subframe number] modulo (cellDTX-DRX-Cycle)=(cellDTX-DRX-StartOffset):

>>>: start cellDTX-DRX-onDurationTimer for this serving cell after cellDTX-DRX-SlotOffset from the beginning of the subframe.

PDCCH Monitoring

>: if cell DTX operation is deactivated for a second type cell; or

>: if the second type cell is in the cell DTX Active Period:

>>: UE monitors PDCCH on this second type cell, in case that the DRX group of this second type cell is in Active Time.

>: if the second type cell is not in the cell DTX Active Period:

>>: if first_event is ongoing, the UE monitors PDCCH on the first type cells and second type cells in both DRX groups;

>>: if second_event is ongoing, the UE monitors PDCCH on the SpCell;

>>: if third_event is ongoing for a DRX group, the UE monitors PDCCH on the first type cells and second type cells in the corresponding DRX group.

Required Operation

For each second type cell, the MAC entity need not:

>: if cell DTX operation is activated and the second type cell is not in the cell DTX Active Period:

>>: monitor PDCCH for the MAC entity's RNTIs listed in TS 38.321 clauses 5.7 and 5.7b, irrespective of the requirements of TS 38.321 clauses 5.7 and 5.7b, except when first_event, second_event or third_event is ongoing;

>>: instruct the physical layer to receive transport block on the DL-SCH of this Serving Cell according to a configured downlink assignment for SPS;
>>: indicate the presence of a configured downlink assignment and deliver the stored HARQ information to the HARQ entity;
>>: set the HARQ Process ID to the HARQ Process ID associated with the PDSCH duration of a configured downlink assignment;
>>: consider the NDI bit for the HARQ process corresponding to the PDSCH duration of a configured downlink assignment to have been toggled for the configured downlink assignment.

For each second type cell, the MAC entity need to:
>: if cell DTX operation is activated and the second type cell is in the cell DTX Active Period:
>>: monitor PDCCH for the MAC entity's RNTIs listed in TS 38.321 clauses 5.7 and 5.7b, irrespective of the requirements of TS 38.321 clauses 5.7 and 5.7b, except when first_event, second_event or third_event is ongoing;
>>: instruct the physical layer to receive transport block on the DL-SCH of this Serving Cell according to a configured downlink assignment for SPS;
>>: indicate the presence of a configured downlink assignment and deliver the stored HARQ information to the HARQ entity;
>>: set the HARQ Process ID to the HARQ Process ID associated with the PDSCH duration of a configured downlink assignment;
>>: consider the NDI bit for the HARQ process corresponding to the PDSCH duration of a configured downlink assignment to have been toggled for the configured downlink assignment.

At S020, the base station may decide to configure UE HR mode operation. The base station transmits to the UE RRCReconfiguration message that comprises HR mode configuration information.

HR mode is configured for a specific downlink carrier of the UE. The specific downlink carrier could be downlink of SpCell.

The RRCReconfiguration message may comprise HR-Mode-Config IE. HR-Mode-Config IE comprises fields/IEs following.

HR-Mode-Config
>: initialMode
>: lP-SS-Config LP-SS-Config IE OPTIONAL
>>: lP-SS-timeOffSet
>>: lP-SS-Periodicity
>>: lP-SS-ARFCN ARFCN-ValueNR
>>: lp-SS-SSB mapping
>>: lpSS-PositionInBurst
>: lp-WUS-ConfigDedicated LP-WUS-ConfigDedicated
>>: lp-WUS-ARFCN ARFCN-ValueNR
>>: nrofLMOPerSSB;
>>: wSoOffset (or wSoStartingOffset)
>>: wSoPeriodicity;
>>: subGroupIndex;
>>: lrTomrSwitching
>: h-DRX-Config H-DRX-Config
>>: minimum-DurationTimer;
>>: additional-DurationTimer;
>>: hr-Mode-exit-Config HR-Mode-Exit-Config In case that LP-SS-Config IE is not comprised in ServingCellConfig IE for SpCell, UE applies LP-SS-Config in SIB1 of a specific cell (e.g. SpCell).

lrTomrSwitching field indicates number of downlink slots of a specific BWP (either initial BWP or firstActiveBWP). UE is required to start minimum_durationTimer and first_HAT_operation after lrTomrSwitching slots since the valid indication is received.

initialMode field indicates the initial sub-mode/H-DRX state. This field indicates either LR-submode/NotHybridActiveTime or MR-submode/HybridActiveTime.

lP-SS-ARFCN indicates center frequency of LP-SS.

lp-WUS-ARFCN indicates center frequency of LP-WUS. If this field is absent, center frequency of LP-SS and center frequency of LP-WUS are same and lP-SS-ARFCN is applied.

ssb-PositionsInBurst indicates the time domain positions of the transmitted SS-blocks in a half frame with SS/PBCH blocks as defined in TS 38.213 [13], clause 4.1. The first/leftmost bit corresponds to SS/PBCH block index 0, the second bit corresponds to SS/PBCH block index 1, and so on. Value 0 in the bitmap indicates that the corresponding SS/PBCH block is not transmitted while value 1 indicates that the corresponding SS/PBCH block is transmitted.

lp-PositionsInBurst indicates the time domain positions of the transmitted LP-SSs a LP-SS burst. One LP-SS burst is transmitted every LP-SS-Periodicity. The first/leftmost bit corresponds to LP-SS index 0, the second bit corresponds to LP-SS index 1, and so on. Value 0 in the bitmap indicates that the corresponding LP-SS is not transmitted while value 1 indicates that the corresponding LP-SS is transmitted. If this field is absent, SS/PBCH block index n is mapped to LP-SS index n. LP-SS associated with actually transmitted SS/PBCH block is actually transmitted.

lp-SS-SSB mapping field indicates the mapping between SSB and LP-SS within a of a half frame and a LP-SS burst. SS/PBCH blocks of a half frame and a LP-SS burst are associated with each other. If this field is absent, one SSB is mapped to one LP-SS according to corresponding index.

At S025, UE and the base station perform HR mode operation.

<H-DRX Operation>

When H-DRX is configured for a UE, the Hybrid Active Time (HAT) for the UE includes the time while:
>: HAT due to that first_event is ongoing (HAT_1);
>: HAT due to that second_event is ongoing (HAT_2);
>: HAT due to that fifth_event is ongoing (HAT_5);
>: HAT due to that sixth_event is ongoing (HAT_6);
third HAT that occurs irregularly when one of first_event is ongoing:

[Operation]

<Initial Operation Upon H-DRX Configuration>

When H-DRX is configured, the UE shall:
>: start the H-DRX with the initial state as indicated by initialMode field.
>: if the initialMode is 'HybridActiveTime/MR-submode',
>>: the UE starts additional-DurationTimer and performs second_HAT_operations; and
>>: when additional-DurationTimer expires, the UE performs second_HAT_to_NHAT_operations.
>: if the initialMode is 'NotHybridActiveTime/LR-submode',
>>: the UE performs NHAT_operations;
>>: the UE performs NHAT_to_first_HAT:
>>>: in case that valid indication is received in wake-up-indication in a WSO; and
>>>: UE performs first_HAT_operation;
>>: the UE performs NHAT_to_second_HAT:

>>>: in case that first_event occurs (or sub-mode change from LR sub-mode to MR sub-mode occurs); and >>>: UE performs second_HAT_operation.

When the UE is in NHAT/LR sub-mode, the UE shall perform NHAT_operation.

When the UE is in HAT/MR sub-mode, the UE shall perform first_HAT_operation or second_HAT_operation.

<First_HAT_Operation in HAT_5>

First_HAT_operation is performed only in SpCell. The reason is to address false alarm of wake-up indication.

For first_HAT_operation, UE performs followings.

>: UE controls the MR to receive downlink MR signal on SpCell;

>: UE monitors PDCCH of SpCell based on a set of CSSs and a set of USSs in a specific DL BWP of the SpCell.

>>: The set of CSSs are CSSs that are configured to be monitored in the currently active DL BWP of the SpCell.

>>: The set of USSs are USSs that are configured to be monitored in the currently active DL BWP of the SpCell.

>>: The specific DL BWP is currently active DL BWP.

>: The UE performs first_HAT_to_second_HAT for transition to second_HAT in case that:

>>: PDCCH addressed by C-RNTI or CS-RNTI or other UE specific RNTI is received in a USS of the set of USSs while minimum_durationTimer is running; or >>: specific first_event occurs;

>: The UE stays in first_HAT in case that:

>>: PDCCH addressed by P-RNTI or SI-RNTI or other common RNTI is received in a CSS of the set of CSSs while minimum_durationTimer is running.

<Second_HAT_Operation in Other HATs>

Second_HAT_operation is performed for all first type cells. UE and the base station perform data transfer in full scale with second_HAT_operation.

For second_HAT_operation, the UE performs followings.

>: The UE controls the MR to receive downlink signal on the first type cells.

>: The UE monitors PDCCH of first type cells based on:

>>: for the SpCell,

>>>: the set of CSSs and the set of USSs in the specific DL BWP of the SpCell; and >>: for each first type cells that is not SpCell, >>>: a set of USSs in the currently active DL BWP of the first type cell.

>: The UE (re)starts additional_timerDuration in case that:

>>: PDCCH addressed by C-RNTI or CS-RNTI or other UE specific RNTI is received in a USS of the set of USSs (of any first type cell) while UE is operating with second_HAT_operation.

The UE is configured to perform first_HAT_operation in case that:

>: minimum_DurationTimer is running;

>: specific first_event (FE1) is ongoing;

>: second_event is ongoing; or

>: random access in the SpCell is triggered.

The UE is configured to perform second_HAT_operation in case that:

>: additional_DurationTimer is running; or

>: specific first_event (FE2, FE3, FE4 or FE5) is ongoing.

<NHAT_Operation>

NHAT_operation is designed for power saving by driving only LR.

For NAT_operation, UE performs followings.

>: UE turns off the MR and controls the LR to receive downlink LR signal on SpCell;

>: UE receives wake-up-signal in at least one LMO of an WSO (UE performs L-DRX operation);

>>: UE performs NAT_to_first_HAT in case that the wake-up-signal comprises a valid indication;

>>: UE receives wake-up-signal in at least one LMO of the next WSO in case that the wake-up signal does not comprise the valid indication.

[Transition]

<First_HAT_to_Second_HAT>

It is triggered when PDCCH addressed by C-RNTI or CS-RNTI or other UE specific RNTI is received in a USS of the set of USSs while minimum_durationTimer is running.

UE controls MR to receive downlink MR signal from first type cells

<First_HAT_to_NHAT>

It is triggered when minimum_durationTimer expires.

UE turns off MR. UE controls LR to receive downlink LR signal from SpCell.

<Second_HAT_to_NHAT>

It is triggered when:

>: additonal_durationTimer expires and none of first_event and second_event and third_event is ongoing; or >: first_event or second_event or third_event is completed and no other first/second/third_event is ongoing.

UE turns off MR. UE controls LR to receive downlink LR signal from SpCell.

<NHAT_to_First_HAT>

It is triggered when valid indication is received in wake-up-indication in a WSO.

UE controls MR to receive downlink MR signal from the SpCell at time point e_1.

UE starts minimum_durationTimer at time point e_1 and performs first_HAT_operation.

If the WSO ends in time point t_1, time point e_1 is at least d_1 slots after time point t_1 d_1 is configured by lrTomrSwitching field.

<NHAT_to_Second_HAT>

It is triggered when one of first_event starts (or start to be on-going);

It is also triggered when autonomous sub-mode change occurs.

UE controls MR to receive downlink MR signal from the first type cells at time point e_2.

If the one of first_event starts at time point t_2, time point e_2 is at least d_2 slots after time point t_2.

d_2 is not configured but determined based on predefined rules. For example, if the transition occurs due to random access procedure, UE determines d_2 slots based on valid random access occasion in the initial uplink bandwidth part of the SpCell (so that preamble transmission can occur as soon as possible). d_2 slot is slot of initial uplink bandwidth part of the SpCell. For another example, if the transition occurs due to autonomous sub-mode change, UE determines d_2 slots based on valid PDCCH monitoring occasions in the specific downlink bandwidth parts of the first type cells (so that PDCCH monitoring on the first type cells can occur as soon as possible). Alternatively, UE determines d_2 slots based on valid PDCCH monitoring occasion in the specific downlink bandwidth parts of SpCell.

<CELL-DTX2 Operation>

In this clause, serving cell can be second type cell.

CELL-DTX2 is applied to a serving cell in case that:

>: Cell DTX operation is configured for the serving cell; and

>: H-DRX is configured for the UE.

PDCCH Monitoring

>: if the UE is in HAT:

>>: if cell DTX operation is deactivated for a second type cell; or

>>: if the second type cell is in the Cell DTX Active Peroid:

>>>: UE monitors PDCCH on this second type cells.

>>: if the second type cell is not in the Cell DTX Active Period:

>>>: if first_event is ongoing, the UE monitors PDCCH on the Serving Cells both DRX groups;

>>>: if second _event is ongoing, the UE monitors PDCCH on the SpCell;

>>>: if third_event is ongoing, the UE monitors PDCCH on the Serving Cells in both DRX groups.

Required Operation

For each second type cell, the MAC entity need not:

>: if UE is not in HAT; or

>: if cell DTX operation is activated and the second type cell is not in the cell DTX Active Period:

>>: monitor PDCCH for the MAC entity's RNTIs listed in TS 38.321 clauses 5.7 and 5.7b, irrespective of the requirements of TS 38.321 clauses 5.7 and 5.7b, except when first_event, second_event or third_event is ongoing;

>>: instruct the physical layer to receive transport block on the DL-SCH of this Serving Cell according to a configured downlink assignment for SPS;

>>: indicate the presence of a configured downlink assignment and deliver the stored HARQ information to the HARQ entity;

>>: set the HARQ Process ID to the HARQ Process ID associated with the PDSCH duration of a configured downlink assignment;

>>: consider the NDI bit for the HARQ process corresponding to the PDSCH duration of a configured downlink assignment to have been toggled for the configured downlink assignment.

For each second type cell, the MAC entity need to:

>: if UE is in HAT; and

>: if cell DTX operation is activated and the second type cell is in the cell DTX Active Period:

>>: monitor PDCCH for the MAC entity's RNTIs listed in TS 38.321 clauses 5.7 and 5.7b, irrespective of the requirements of TS 38.321 clauses 5.7 and 5.7b, except when first_event, second_event or third_event is ongoing;

>>: instruct the physical layer to receive transport block on the DL-SCH of this Serving Cell according to a configured downlink assignment for SPS;

>>: indicate the presence of a configured downlink assignment and deliver the stored HARQ information to the HARQ entity;

>>: set the HARQ Process ID to the HARQ Process ID associated with the PDSCH duration of a configured downlink assignment;

>>: consider the NDI bit for the HARQ process corresponding to the PDSCH duration of a configured downlink assignment to have been toggled for the configured downlink assignment.

During the HR mode operation, when UE detects that autonomous mode change or autonomous sub-mode change occurs, UE transmits to the base station a RRC message to report the change of (sub-)mode S030.

In case that autonomous mode change occurs or autonomous sub-mode change due to LP-SS RSRP occurs, UE generates and transmits the RRC message.

In case that autonomous sub-mode change due to random access occurs, UE does not generates the RRC message because the base station will be informed the situation when random access procedure is completed.

The ModeChangeReport message comprises:

>: lpSs-rsrp LP-SS RSRP of the SpCell; and

>: currentMode Enumerated (MRmode, HRmode);

>>; if mode change to MR mode occurs, this field is set to MRmode;

>>: if sub-mode change to MR sub-mode occurs, this field is set to HRmode.

At S035, The base station may release HR mode configuration by transmitting RRCReconfiguration message that comprises an indication to release HR mode configuration.

At S040, the base station and the UE perform MR mode operation.

Figure 13:
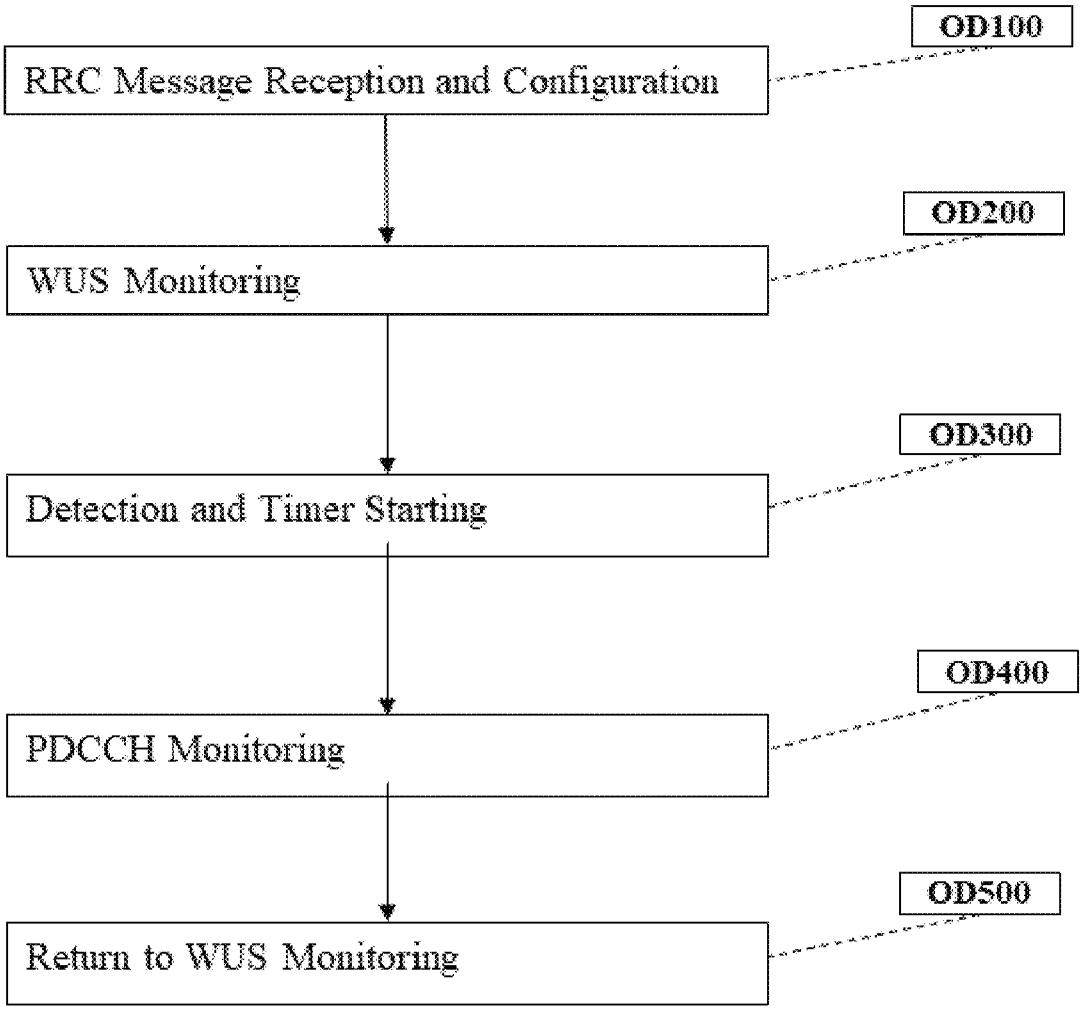
FIG. 13 is a block diagram illustrating operations of the terminal.

FIG. 13 illustrates operations of terminal.

At OD100, the terminal receives from a base station a radio resource control (RRC) message for Wake-Up Signal (WUS) reception. The RRC message comprises a parameter indicating information to be monitored in WUS, a parameter indicating length of first timer, and a parameter indicating time offset between start of WUS occasion and start of first timer.

At OD200, the terminal performs WUS monitoring for a special cell based on the RRC message. The terminal receives n WUSs per specific periodicity during a specific time duration. The value n is determined based on a parameter indicating number of monitoring occasions. The specific periodicity is determined based on a parameter indicating periodicity for WUS monitoring.

At OD300, in case that specific information is detected in a WUS reception, the terminal stops WUS monitoring for the special cell and starts a first timer at a specific time point. The specific time point is determined based on the parameter indicating time offset between start of WUS occasion and start of first timer.

At OD400, the terminal starts PDCCH monitoring for a plurality of serving cells based on the first timer being running. The plurality of serving cells comprise the special cell and currently activated secondary cells. PDCCH monitoring continues while the first timer is running.

At OD500, in case that a Medium Access Control (MAC) message containing a specific logical channel identity is received during PDCCH monitoring, the terminal stops the first timer and stops PDCCH monitoring for the plurality of serving cells. The terminal then starts WUS monitoring for the special cell.

Figure 14:
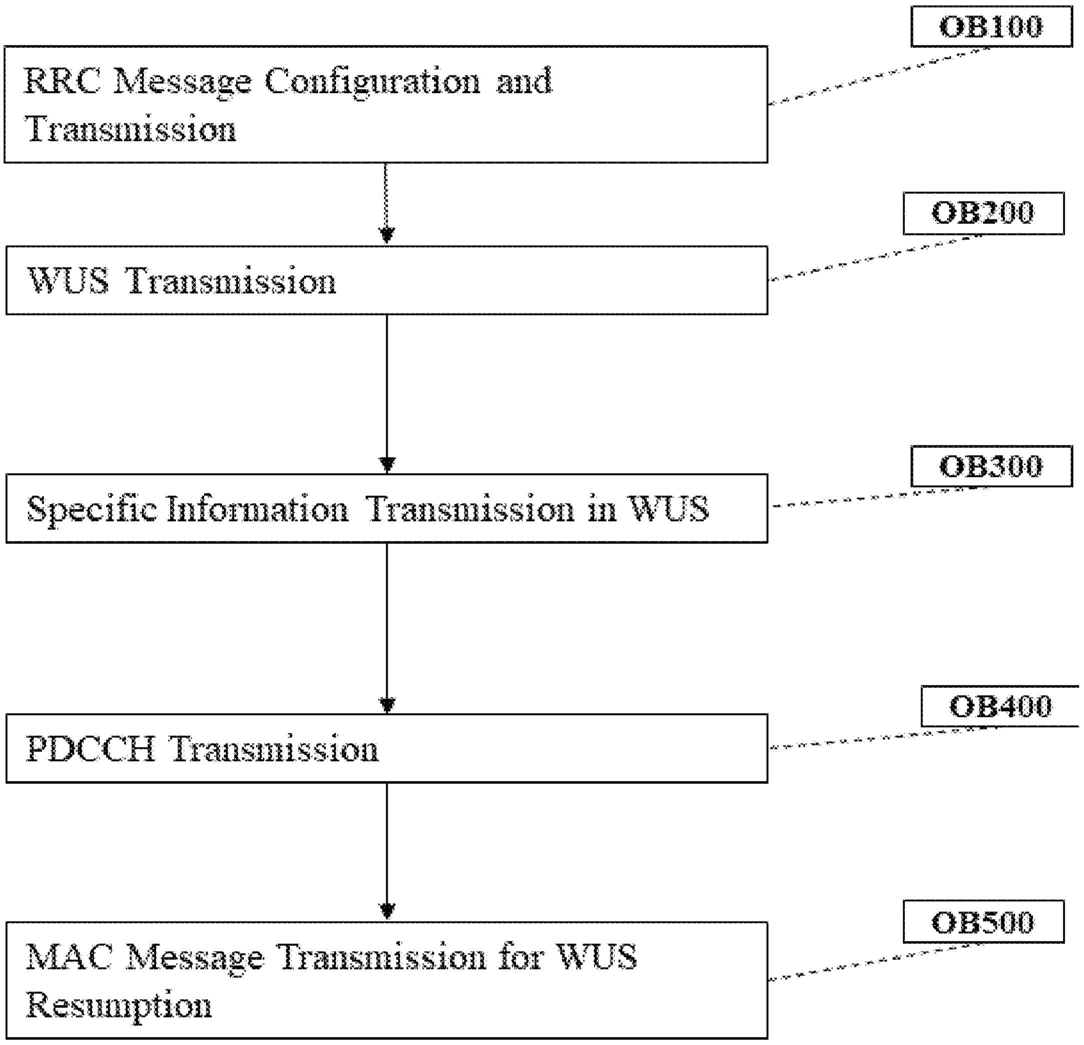
FIG. 14 is a block diagram illustrating operations of the base station.

FIG. 14 illustrates operations of terminal.

At OB100, the base station transmits to a terminal a radio resource control (RRC) message for Wake-Up Signal (WUS) reception. The RRC message comprises a parameter indicating information to be monitored in WUS, a parameter indicating length of first timer, and a parameter indicating time offset between start of WUS occasion and start of first timer.

At OB200, the base station transmits n WUSs per specific periodicity during a specific time duration for a special cell. The value n is determined based on a parameter indicating number of monitoring occasions. The specific periodicity is determined based on a parameter indicating periodicity for WUS monitoring. The specific time duration is not part of Connected-Discontinuous Reception (C-DRX) active time and is part of Cell Discontinuous Transmission (DTX) inactive period.

At OB300, the base station transmits specific information in a WUS reception to trigger the terminal to stop WUS monitoring for the special cell and start PDCCH monitoring for a plurality of serving cells. The specific information is indicated by the parameter indicating information to be monitored in WUS.

At OB400, the base station transmits PDCCH for the plurality of serving cells during a time period corresponding to the first timer being running at the terminal. The plurality of serving cells comprise the special cell and currently activated secondary cells. The first timer starts at a specific time point determined based on the parameter indicating time offset between start of WUS occasion and start of first timer.

At OB500, the base station transmits a Medium Access Control (MAC) message containing a specific logical channel identity to the terminal during PDCCH monitoring. This MAC message triggers the terminal to stop the first timer, stop PDCCH monitoring for the plurality of serving cells, and start WUS monitoring for the special cell.

Figure 15:
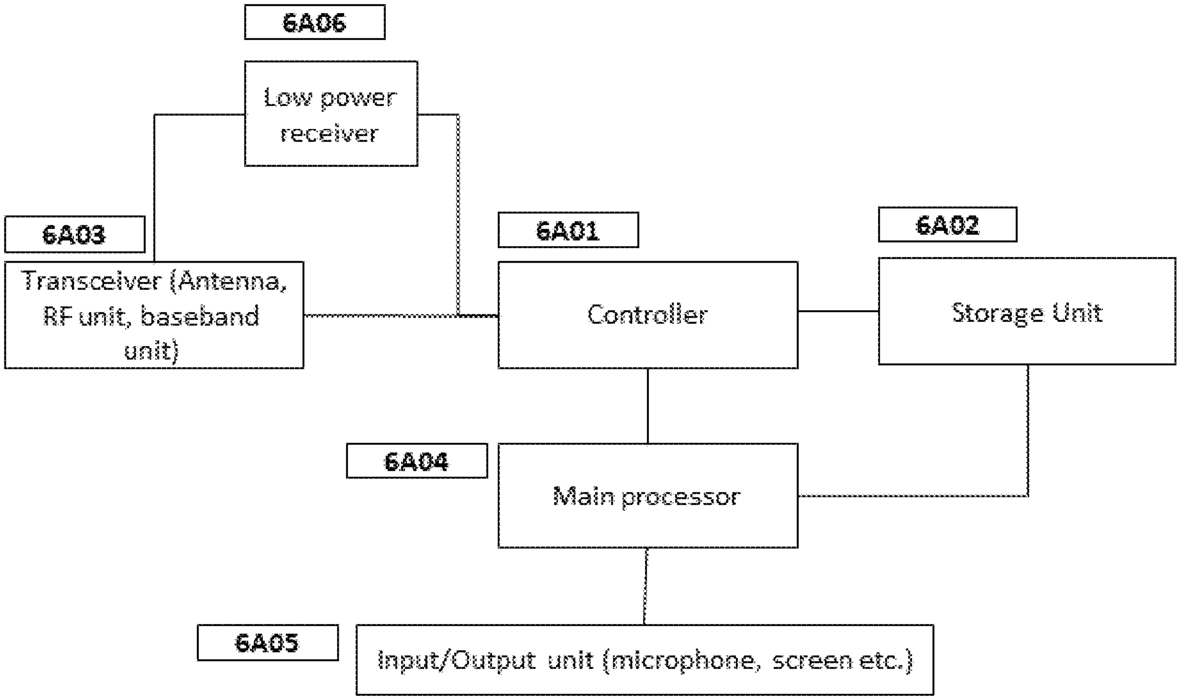
FIG. 15 is a block diagram illustrating the internal structure of a terminal.

FIG. 15 is a block diagram illustrating the internal structure of a UE to which the disclosure is applied.

Referring to the diagram, the UE includes a controller 6A01, a storage unit 6A02, a transceiver 6A03, a main processor 6A04, I/O unit 6A05 and low power receiver 6A06.

The controller 6A01 controls the overall operations of the UE in terms of mobile communication. For example, the controller 6A01 receives/transmits signals through the transceiver 6A03 and through the low power receiver. In addition, the controller 6A01 records and reads data in the storage unit 6A02. To this end, the controller 6A01 includes at least one processor. For example, the controller 6A01 may include a communication processor (CP) that performs control for communication and an application processor (AP) that controls the upper layer, such as an application program. The controller controls storage unit and transceiver such that UE operations illustrated in the present disclosure are performed.

The storage unit 6A02 stores data for operation of the UE, such as a basic program, an application program, and configuration information. The storage unit 6A02 provides stored data at a request of the controller 6A01.

The transceiver 6A03 consists of a RF processor, a baseband processor and one or more antennas. The RF processor performs functions for transmitting/receiving signals through a wireless channel, such as signal band conversion, amplification, and the like. Specifically, the RF processor up-converts a baseband signal provided from the baseband processor into an RF band signal, transmits the same through an antenna, and down-converts an RF band signal received through the antenna into a baseband signal. The RF processor may include a transmission filter, a reception filter, an amplifier, a mixer, an oscillator, a digital-to-analog converter (DAC), an analog-to-digital converter (ADC), and the like. The RF processor may perform MIMO and may receive multiple layers when performing the MIMO operation. The baseband processor performs a function of conversion between a baseband signal and a bit string according to the physical layer specification of the system. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The main processor 6A04 controls the overall operations other than mobile operation. The main processor 6A04 process user input received from I/O unit 6A05, stores data in the storage unit 6A02, controls the controller 6A01 for required mobile communication operations and forward user data to I/O unit 6A05.

I/O unit 6A05 consists of equipment for inputting user data and for outputting user data such as a microphone and a screen. I/O unit 6A05 performs inputting and outputting user data based on the main processor's instruction.

Low power receiver 6A06 is connected with antenna part of the transceiver and controller. Low power receiver process LP-SS and LP-WUS based on controller's control.

Figure 16:
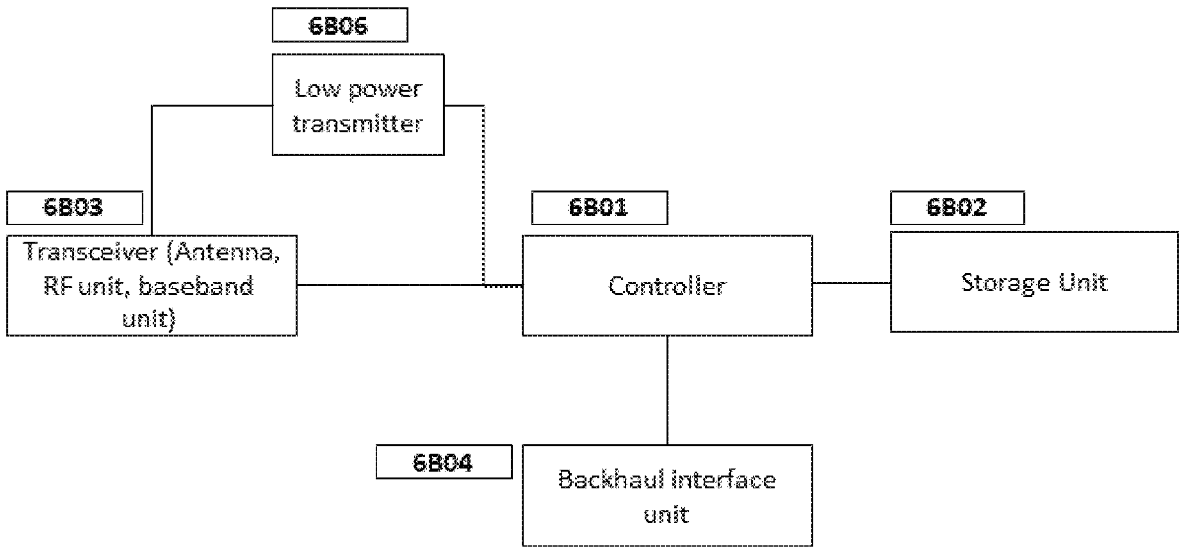
FIG. 16 is a block diagram illustrating the configuration of a base station.

FIG. 16 is a block diagram illustrating the configuration of a base station according to the disclosure.

As illustrated in the diagram, the base station includes a controller 6B01, a storage unit 6B02, a transceiver 6B03 a backhaul interface unit 6B04 and low power transmitter 6B06.

The controller 6B01 controls the overall operations of the main base station. For example, the controller 6B01 receives/transmits signals through the transceiver 6B03 or through low power transmitter or through the backhaul interface unit 6B04. In addition, the controller 6B01 records and reads data in the storage unit 6B02. To this end, the controller 6B01 may include at least one processor. The controller controls transceiver, storage unit and backhaul interface such that base station operation illustrated in the present disclosure are performed.

The storage unit 6B02 stores data for operation of the main base station, such as a basic program, an application program, and configuration information. Particularly, the storage unit 6B02 may store information regarding a bearer allocated to an accessed UE, a measurement result reported from the accessed UE, and the like. In addition, the storage unit 6B02 may store information serving as a criterion to deter mine whether to provide the UE with multi-connection or to discontinue the same. In addition, the storage unit 6B02 provides stored data at a request of the controller 6B01.

The transceiver 6B03 consists of a RF processor, a baseband processor and one or more antennas. The RF processor performs functions for transmitting/receiving signals through a wireless channel, such as signal band conversion, amplification, and the like. Specifically, the RF processor up-converts a baseband signal provided from the baseband processor into an RF band signal, transmits the same through an antenna, and down-converts an RF band signal received through the antenna into a baseband signal. The RF processor may include a transmission filter, a reception filter, an amplifier, a mixer, an oscillator, a DAC, an ADC, and the like. The RF processor may perform a down link MIMO operation by transmitting at least one layer. The baseband processor performs a function of conversion between a baseband signal and a bit string according to the physical layer specification of the first radio access technology. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The backhaul interface unit 6B04 provides an interface for communicating with other nodes inside the network. The backhaul interface unit 6B04 converts a bit string transmitted from the base station to another node, for example, another base station or a core network, into a physical signal, and converts a physical signal received from the other node into a bit string.

Low power transmitter 6B06 is connected with antenna part of the transceiver and controller. Low power transmitter processes LP-SS and LP-WUS based on controller's control.

What is claimed is:

1. A method performed by a terminal, the method comprising:

receiving from a base station a radio resource control (RRC) message for Wake-Up Signal (WUS) reception;

performing WUS monitoring for a special cell based on the RRC message;

in case that specific information is detected in a WUS reception:

stopping the WUS monitoring for the special cell; and starting Physical Downlink Control Channel (PDCCH) monitoring for a plurality of serving cells;

wherein:

the PDCCH monitoring is performed while a first timer is running;

the first timer starts at a specific time point;

length of the first timer is configured by a parameter indicating length of the first timer; and the specific time point is determined based on a parameter indicating a time offset between a start of a WUS occasion and a start of the first timer, wherein:

the specific information is indicated by a parameter indicating information to be monitored in WUS, and wherein the RRC message comprises:

the parameter indicating the information to be monitored in the WUS;

the parameter indicating the length of the first timer; and the parameter indicating the time offset between the start of the WUS occasion and the start of the first timer.

2. The method of claim 1, further comprising:

in case that a Medium Access Control (MAC) message containing a specific logical channel identity is received during the PDCCH monitoring:

stopping the first timer;

stopping the PDCCH monitoring for the plurality of serving cells; and starting the WUS monitoring for the special cell.

3. The method of claim 1, wherein, to perform the WUS monitoring:

the terminal receives n WUSs per specific periodicity during a specific time duration;

n is determined based on a parameter indicating number of monitoring occasions; and the specific periodicity is determined based on a parameter indicating a periodicity for WUS monitoring.

4. The method of claim 3, wherein the RRC message comprises the parameter indicating the number of monitoring occasions and the parameter indicating the periodicity for WUS monitoring.

5. The method of claim 3, wherein the specific time duration:

is not part of Connected-Discontinuous Reception (C-DRX) active time; and is part of Cell Discontinuous Transmission (DTX) inactive period.

6. The method of claim 1, wherein the plurality of serving cells comprise the special cell and currently activated secondary cells.

7. The method of claim 1, wherein the first timer and a second timer start as a consequence of the specific information being detected in the WUS reception.

8. The method of claim 7, wherein:

the first timer controls PDCCH monitoring for a first set of serving cells; and the second timer controls PDCCH monitoring for a second set of serving cells.

9. A terminal in a wireless communication system, the terminal comprising:

a transceiver configured to transmit and receive signals; and a controller configured to control the transceiver to:

receive from a base station a radio resource control (RRC) message for Wake-Up Signal (WUS) reception, perform WUS monitoring for a special cell based on the RRC message, in case that specific information is detected in a WUS reception:

stop the WUS monitoring for the special cell; and start Physical Downlink Control Channel (PDCCH) monitoring for a plurality of serving cells, wherein:

the PDCCH monitoring is performed while a first timer is running;

the first timer starts at a specific time point;

length of the first timer is configured by a parameter indicating length of the first timer; and the specific time point is determined based on a parameter indicating a time offset between a start of a WUS occasion and a start of the first timer, wherein:

the specific information is indicated by a parameter indicating information to be monitored in WUS, and wherein the RRC message comprises:

the parameter indicating the information to be monitored in the WUS;

the parameter indicating the length of the first timer; and the parameter indicating the time offset between the start of the WUS occasion and the start of the first timer.

* * * * *